US 8,402,867 B2

(12) United States Patent
Harif

(10) Patent No.: US 8,402,867 B2
(45) Date of Patent: Mar. 26, 2013

(54) CUTTING TOOL WITH PROTRUSIONS, AND METHODS OF USE THEREOF

(75) Inventor: Gershon Harif, Ramat Gan (IL)

(73) Assignee: No Screw Ltd., Holon (IL)

( * ) Notice: Subject to any disclaimer, the term of this patent is extended or adjusted under 35 U.S.C. 154(b) by 499 days.

(21) Appl. No.: 12/739,111

(22) PCT Filed: Oct. 16, 2008

(86) PCT No.: PCT/IB2008/002742
§ 371 (c)(1),
(2), (4) Date: Apr. 21, 2010

(87) PCT Pub. No.: WO2009/053803
PCT Pub. Date: Apr. 30, 2009

(65) Prior Publication Data
US 2010/0310329 A1    Dec. 9, 2010

(30) Foreign Application Priority Data

| Oct. 22, 2007 | (IL) | 186839 |
| Dec. 30, 2007 | (IL) | 188496 |
| Jul. 13, 2008 | (IL) | 192785 |

(51) Int. Cl.
*B23B 1/00* (2006.01)
*B23B 27/00* (2006.01)
(52) U.S. Cl. .......... 82/1.11; 29/90.01; 407/113
(58) Field of Classification Search .......... 407/113–115; 470/199; 72/71, 186; 29/90.01, 412–417; 82/1.11
See application file for complete search history.

(56) References Cited

U.S. PATENT DOCUMENTS

| 4,474,721 A * | 10/1984 | Carpenter | 264/157 |
| 4,681,486 A * | 7/1987 | Hale | 407/114 |
| 4,776,733 A | 10/1988 | Pettersson | |
| 5,160,232 A * | 11/1992 | Maier | 408/223 |
| 5,549,425 A * | 8/1996 | Bernadic et al. | 407/114 |
| 5,779,401 A * | 7/1998 | Stallwitz et al. | 407/114 |
| 5,791,832 A * | 8/1998 | Yamayose | 407/113 |
| 5,964,552 A * | 10/1999 | Larsen | 407/113 |
| 5,975,812 A * | 11/1999 | Friedman | 407/114 |

(Continued)

FOREIGN PATENT DOCUMENTS

| EP | 0 502 834 A1 | 9/1992 |
| EP | 1 547 710 A1 | 6/2005 |

(Continued)

OTHER PUBLICATIONS

International Search Report for International Application No. PCT/IB2008/002742, mailed on Mar. 9, 2009, 2 pages.

*Primary Examiner* — Andrea Wellington
*Assistant Examiner* — Sara Addisu
(74) *Attorney, Agent, or Firm* — Nath, Goldberg & Meyer; Jerald L. Meyer

(57) ABSTRACT

A cutting element adapted for removing a chip from a surface of a workpiece has at least one cutting edge defined by an intersection line between a rake and a relief surface and is formed with one or more workpiece deforming protrusions. At least a portion of the protrusions is spaced from the cutting edge such this portion protrudes, along a plane perpendicular to the relief surface and passing through the cutting edge, in a direction transverse to the relief surface beyond the cutting edge. At least the projecting portion of at least one of the protrusions is constructed so as to deform the workpiece before its contact with the cutting edge.

27 Claims, 37 Drawing Sheets

U.S. PATENT DOCUMENTS

| | | | |
|---|---|---|---|
| 6,065,905 A | 5/2000 | Kinton | |
| 6,099,209 A * | 8/2000 | Murray et al. | 407/1 |
| 6,126,366 A * | 10/2000 | Lundblad | 407/102 |
| 6,138,540 A * | 10/2000 | Niemi | 82/1.11 |
| 6,164,878 A * | 12/2000 | Satran et al. | 407/113 |
| 6,238,146 B1 * | 5/2001 | Satran et al. | 407/113 |
| 6,666,630 B2 * | 12/2003 | Zimmermann et al. | 409/132 |
| 6,739,808 B1 * | 5/2004 | Ghosh | 407/114 |
| 6,957,933 B2 * | 10/2005 | Pachao-Morbitzer et al. | 407/11 |
| 7,264,425 B1 | 9/2007 | Viol | |
| 7,275,896 B2 * | 10/2007 | Nudelman | 407/114 |
| 7,862,263 B2 * | 1/2011 | van Iperen | 407/60 |
| 7,896,586 B2 * | 3/2011 | Morgulis | 407/114 |
| 7,905,688 B2 * | 3/2011 | Ertl et al. | 407/42 |
| 8,277,151 B2 * | 10/2012 | Wandeback | 407/42 |
| 2002/0119016 A1 * | 8/2002 | Woodward | 407/35 |
| 2004/0170481 A1 * | 9/2004 | Gati | 407/113 |
| 2004/0265075 A1 * | 12/2004 | Kolker | 407/113 |
| 2006/0045633 A1 * | 3/2006 | Morgulis | 407/33 |
| 2008/0298909 A1 * | 12/2008 | Gaudreault | 407/47 |
| 2009/0220312 A1 * | 9/2009 | Shamoto et al. | 407/114 |
| 2010/0183386 A1 * | 7/2010 | Heinloth et al. | 407/113 |
| 2010/0254775 A1 * | 10/2010 | Hecht | 407/103 |
| 2010/0316452 A1 * | 12/2010 | Ishida | 407/33 |
| 2012/0282047 A1 * | 11/2012 | Choi et al. | 407/103 |

FOREIGN PATENT DOCUMENTS

| | | |
|---|---|---|
| JP | 05116018 A * | 5/1993 |
| JP | 2007-69290 A | 3/2007 |
| WO | 02/40850 A1 | 5/2002 |

* cited by examiner

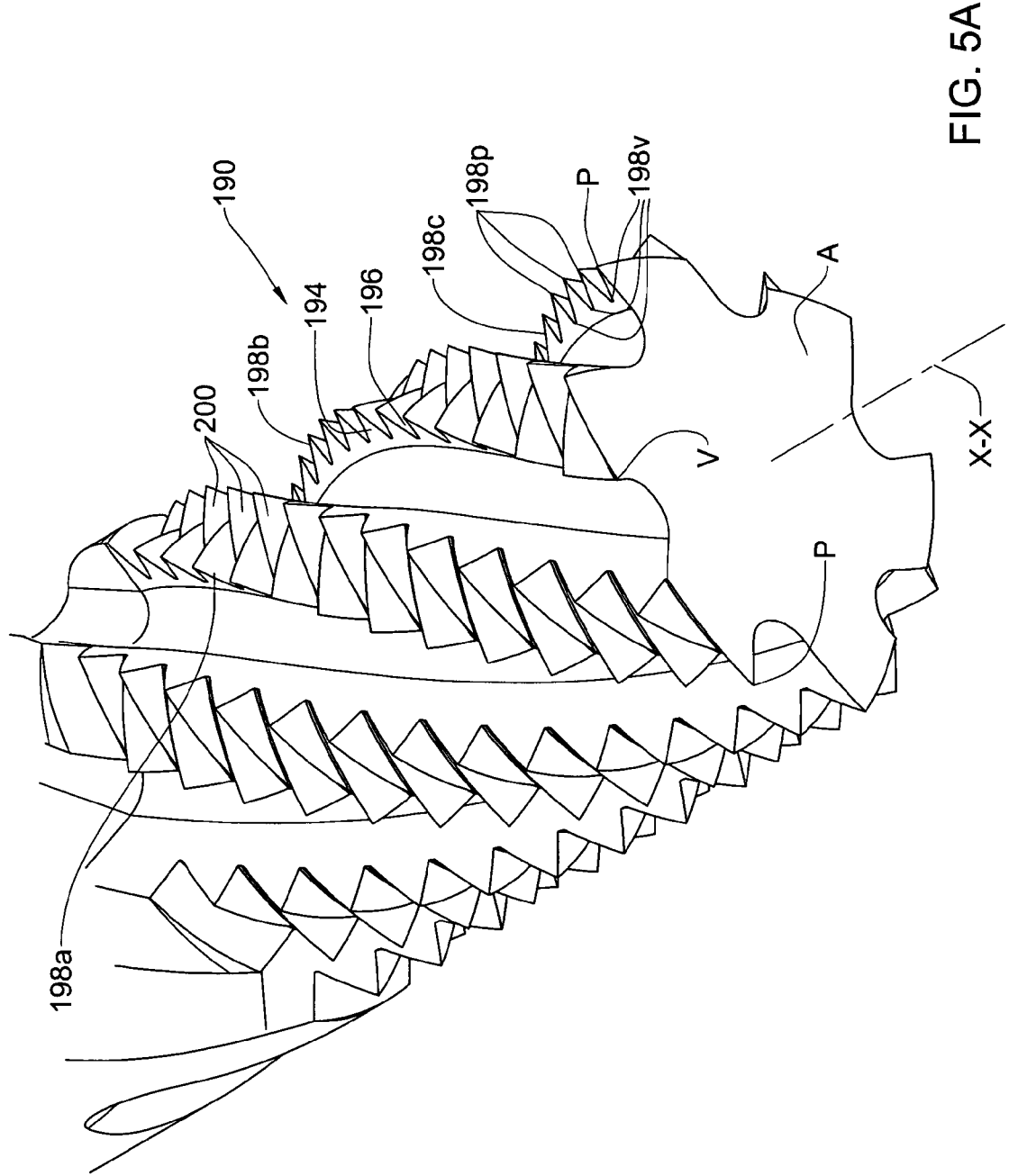

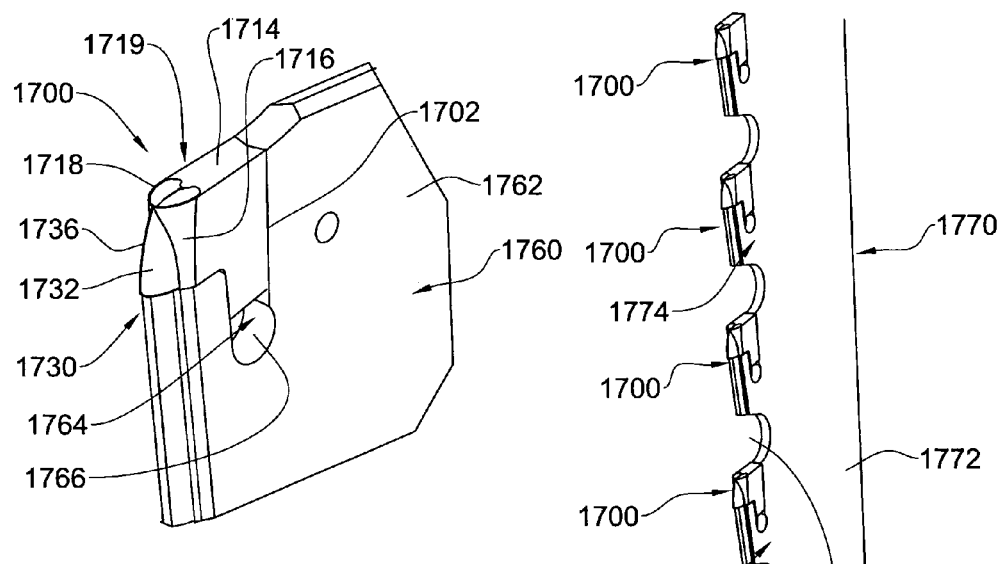
FIG. 18A
FIG. 18B
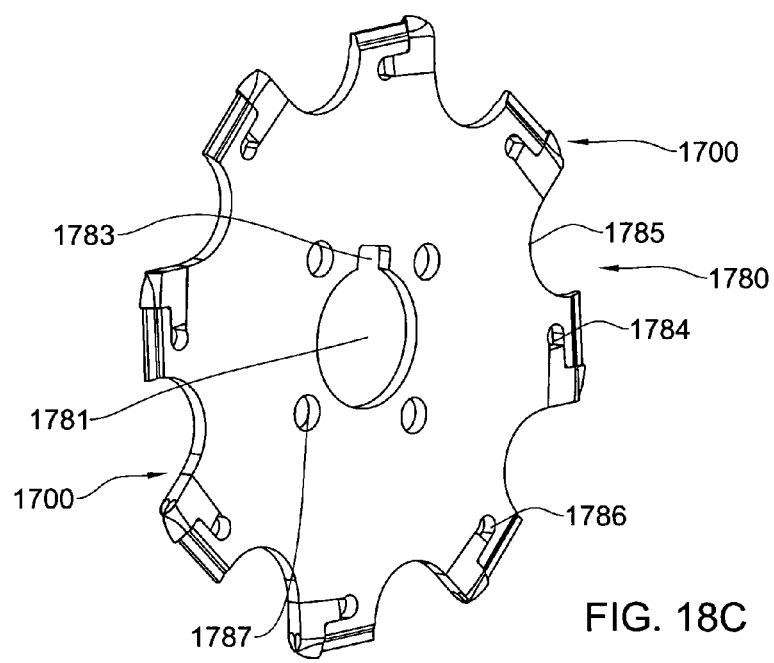
FIG. 18C ns: us# CUTTING TOOL WITH PROTRUSIONS, AND METHODS OF USE THEREOF This is a National Phase Application filed under 35 U.S.C. 371 as a national stage of PCT/IB2008/002742, filed Oct. 16, 2008, an application claiming foreign priority benefits under 35 USC 119 of Israeli Application No. 186839, filed Oct. 22, 2007, Israeli Application No. 188496, filed Dec. 30, 2007, and Israeli Application No. 192785, filed Jul. 13, 2008, the content of each of which is hereby incorporated by reference in its entirety.

FIELD OF THE INVENTION

This invention relates to cutting tools, in particular to cutting tools used in the automated machinery industry.

BACKGROUND OF THE INVENTION

Cutting tools are used for removing material from a workpiece to manufacture therefrom of desired final element. There exists in common practice a great variety of operations for the removal of material, for each of which, a specific tool is designed. Examples of such operations are drilling, milling, turning, boring etc.

The majority of cutting tools are formed with a sharp cutting edge adapted to come in contact with the workpiece, within a cutting zone, to remove material therefrom in the form of a chip, in a process referred to as chipping. During such process there is usually provided a linear displacement of the cutting tool relative to the workpiece, referred to as 'feed' and either rotation of the cutting tool with respect to the workpiece, such as e.g. in milling and drilling, or rotation of the workpiece with respect to the cutting tool, such as e.g. in turning.

Chips must be evacuated continuously during chipping and any congestion may rapidly lead to high loads, overheating and consequent break-down and failure of the cutting tool.

The cutting edge of a cutting tool is generally defined as an intersection line between a rake surface and a relief surface.

The rake surface is adapted to come in contact with the removed chip and, as such, its geometry influences the length and geometry of the removed chip, and more importantly, the manner of evacuation of the chip from the cutting zone.

The relief surface is generally designed so as not to come in contact with the portion of the workpiece from which the chip has been removed. Depending on the angle between the relief surface and the rake surface, the cutting tool is positioned such as to avoid contact between the relief surface and the workpiece.

Normally, chipping may be divided into two general types—rough chipping type and fine chipping. During rough chipping, an amount M of material is removed from the workpiece, providing it with the general shape approximating that of the final desired element. During fine chipping, the workpiece is brought to the final shape by fine and precise removal of material of an amount m. Clearly, the amount of removed material M is normally much greater than that of the removed material m, and it constitutes the majority of the overall removed material. Thus, it would be understood that the majority of time spent on manufacturing a desired element from a workpiece is dedicated to rough chipping.

The amount of material to be removed per time unit by a given cutting tool from a given workpiece is usually controlled by the feed and speed of rotation of the cutting tool relative to the workpiece. The thickness of the chip removed from the workpiece is determined by the speed of rotation $V_R$ as well as the feed F. Rotation speed $V_R$ is, in turn, determined by the power provided by a motor responsible for the rotation.

Loads exerted on the cutting tool during chipping may be very high and they depend drastically on the feed F and rotation speed and $V_R$, as well as the materials from which the cutting tool and workpiece are made. The loads exerted on the cutting tool may be so high as to inflict damage on the thereon and rendering it useless. On top of this, friction of the cutting tool with the workpiece cause an increase in the temperature of the workpiece and require extensive cooling, usually in the form of a cooling liquid. Thus, the feed F and rotation speed $V_R$ are limited, and so is, as a consequence, the power provided by the motor. Thus, feed and rotation speed F and $V_R$ usually range between 1-2.5 m/s and 500-1000 rpm respectively.

It would also be appreciated from the above that, in general, the loads on the cutting tools are much greater during the rough chipping than during fine chipping.

SUMMARY OF THE INVENTION

According to the present invention there is provided a cutting element adapted for removing a chip from a surface of a workpiece, said cutting element having at least one cutting edge defined by an intersection line between a rake and a relief surface, said cutting element further being formed with one or more deforming protrusions at least a portion of which is spaced from the cutting edge in the direction transverse to said relief surface such as to deform said workpiece before its contact with the cutting edge.

The one or more deforming protrusions may be formed on the relief surface or on an extension of the cutting insert preceding the cutting edge to enable the deforming protrusion(s) to engage said workpiece prior to the cutting edge.

Said cutting element may be used in a variety of cutting machines, for example, for Computerized Numerical Control (CNC), adapted for performing one or more of at least the following operations: turning, grooving, threading, milling, drilling, etc.

In the event said cutting element is employed in a cutting tool adapted for rotary motion for cutting a stationary workpiece, the circumferential envelope defined by points of said deforming protrusions which are outermost along said extension thereof may have a greater radius than the circumferential envelope defined by the cutting edge.

In the event said cutting element is employed in a cutting tool adapted for cutting a rotating workpiece, said extension corresponds to the direction of the feed of said cutting tool such that when said cutting edge is in contact with said workpiece, a contact is also provided between said deforming protrusion(s) and said workpiece.

Said cutting element may be a cutting tool constituting a part of or adapted for mounting on a cutting machine, and be, for example, a cutting head. The cutting head may be formed with a plurality of cutting edges with a corresponding plurality of rake and relief surfaces. For example, said cutting head may be a rough milling head for a CNC cutting machine.

Alternatively, the cutting element may be a cutting insert adapted for mounting on a cutting tool holder. Such cutting tool may have a plurality of cutting inserts. Each cutting insert may be formed with a plurality of cutting edges.

Said at least one deforming protrusion may extend along the relief surface transversely to the cutting edge along a length which essentially exceeds its said extension transverse to the relief surface. In particular, the protrusion may be in the form of a prolonged 'ridge' having a first end located adjacent said cutting edge, and a second end spaced from the cutting edge along the relief surface, with the elevation of the ridge over the relief surface being either invariant or varying along its length.

For example, the elevation of the ridge may increase continuously from the first end to the second end thereof so that the second end of said ridge has a higher elevation above said relief surface than the first end thereof. In addition, the ridge may have a tapering form, wherein the second end of said ridge is essentially wider than the first end thereof along a direction transverse to the length of said ridge. According to a specific design embodiment, the ridge may also be curved, i.e. crescent shaped.

The deforming protrusion may have said extension transverse to the relief surface which is not essentially less than its extension along the relief surface. In particular, the protrusion may have a base at the relief surface and a top spaced from the relief surface to a distance which is approximately equal to maximal extension of the base. For example, the protrusion may have a conical shape, wherein the base of said cone is located on the relief surface and the protrusion extends normal to the relief surface, such that the vertex of the cone is elevated above said relief surface.

The relief surface of the cutting element may be formed with a plurality of adjacent deforming protrusions disposed side by side to form a deforming pattern, e.g. in the form of crests and troughs, extending over said relief surface along said cutting edge.

The protrusions may be arranged in an array, e.g. consequent rows. In addition, each of said rows may be shifted from the previous row such that the top of a protrusion in one row is aligned with a 'valley' between two adjacent protrusions of the adjacent row.

In case conical protrusions are employed, the elevation of the vertexes of said conical protrusions above the relief surface may vary so as to allow gradual deformation of the surface of the workpiece, e.g. the closer the protrusion to said cutting edge, the lower the elevation. This may allow gradual deformation of the surface of the workpiece, i.e. each subsequent row of protrusions penetrates deeper into said workpiece and causes further deformation thereof.

Alternatively, the elevation of the vertexes above the relief surface may be essentially similar, whereby once the first row of protrusions is worn out, the second row of protrusions may perform the deformation, etc. In the event the rows are shifted relative to each other as previously mentioned, whereby upon wear of first couple of rows, second and third couples will perform the deformation and so on and so forth.

According to another specific design variation, the deforming protrusions may further extend over the cutting edge to protrude therefrom and from the relief surface in the feed direction and to be elevated above the rake surface, to form non-active cutting edge portions adapted to form recesses in the workpiece prior to active cutting edge portions removing the workpiece material between recesses.

When said cutting element comprises more than one cutting edge lying on the same cutting envelope, the deforming protrusions on the relief surface of one cutting edge may be arranged such that the phase of the peaks thereof is shifted with respect to the phase of the peaks of the protrusions on the relief surface of an adjacent cutting edge. According to one example, the peaks of the protrusions on one relief surface may correspond to the troughs of the protrusions of the other relief surface. According to another example, the peaks may be simply slightly shifted relative to one another. The shifting distance may be determined, inter alia, according to the number of cutting edges.

According to one specific design embodiment, the cutting element may be formed with an undulating cutting edge, i.e. also having peaks and troughs, for example, of sinusoidal shape, which may be used for rough chipping, wherein each deforming protrusion is positioned such that the ridge thereof is positioned between two peaks of the undulating cutting edge. Thus, the peaks and troughs of the undulating cutting edge may form a corresponding peak and trough pattern after removing the chip from the workpiece, whereby the peaks and troughs of the deforming protrusions may 'split' each peak of the pattern and further deform the surface of the workpiece. In any case, the deforming protrusions may be so arranged with respect to the undulating cutting edge that the pattern of the deformed outer surface of the workpiece corresponds to the shape of the undulating cutting edge.

The deformation of the surface of the workpiece by the protrusion(s) is intended to degrade the said surface, thereby lowering the resistance thereof during removal of material therefrom and, consequently, facilitating the cutting operation. Thus, when a cutting edge is to remove material from the deformed surface, due to the lowered resistance, the loads applied to the cutting edge may be essentially lower than those applied thereto in case said surface has not been deformed. Lowering the loads may also result in lower heating of the cutting edge, and consequently the cutting element itself as well as lower tear.

In particular, the decrease in resistance may provide at least one of the following major advantages:

- under the same feed and rotation speed F and $V_R$, the cutting element with deforming protrusions according to the present invention may be subjected to lower loads than an equivalent cutting tool with no protrusions and, as such, be used for a longer overall period of time T;
- under the same loads, the cutting element may operate at greater feed and rotation speed F and $V_R$ than an equivalent cutting tool with no protrusions, and, as such, remove a greater amount of material from the workpiece per time unit t;
- under the same rotation speed $V_R$, the cutting element may be allowed a greater feed F than an equivalent cutting tool with no protrusions, thus removing a thicker chip per time unit t for one turn of the cutting tool or workpiece; and
- under the same feed F, the cutting element or the workpiece may be allowed a greater rotation speed $V_R$ than an equivalent cutting tool with no protrusions, removing a greater amount of chips per time unit t.

According to one example, the thickness of the chip n and extent u to which said at least one deforming protrusion protrudes beyond the cutting edge in the feed direction, may be interrelated such that $u \leq 1.5n$.

According to another aspect of the present invention there is provided a method for performing a cutting operation on a workpiece using the cutting element according to the previous aspect of the present invention, said method comprising:

a) deforming said workpiece so as to produce a deformed external surface; and b) Providing said cutting element with a feed allowing the cutting edge of said element to remove at least a portion of said deformed external surface.

According to a further aspect of the invention, there is provided a method for performing a turning operation or the like on a rotating workpiece using a cutting element according to the previous aspect of the present invention, said method comprising:

c) aligning the cutting edge of said cutting element above a center of rotation of said rotating workpiece;

d) moving said cutting element towards said workpiece so as to perform the cutting of said workpiece by said cutting edge; and e) deforming the workpiece under said cutting edge by said one or more deforming protrusions, thereby providing support to said cutting tool by said protrusion within the workpiece.

BRIEF DESCRIPTION OF THE DRAWINGS

In order to understand the invention and to see how it may be carried out in practice, embodiments will now be described, by way of non-limiting example only, with reference to the accompanying drawings, in which:

FIG. 5A is an isometric view of a rough milling head according to a yet further example of the present invention;

FIG. 18A is a schematic isometric view of a parting tool comprising a parting head according to yet another embodiment of the present invention;

FIG. 18B is a schematic isometric view of a straight saw comprising the same parting head as shown in FIG. 18A;

FIG. 18C is a schematic isometric view of a disc saw comprising the same parting head as shown in FIG. 18A;

DETAILED DESCRIPTION OF EMBODIMENTS

Figure 1A:
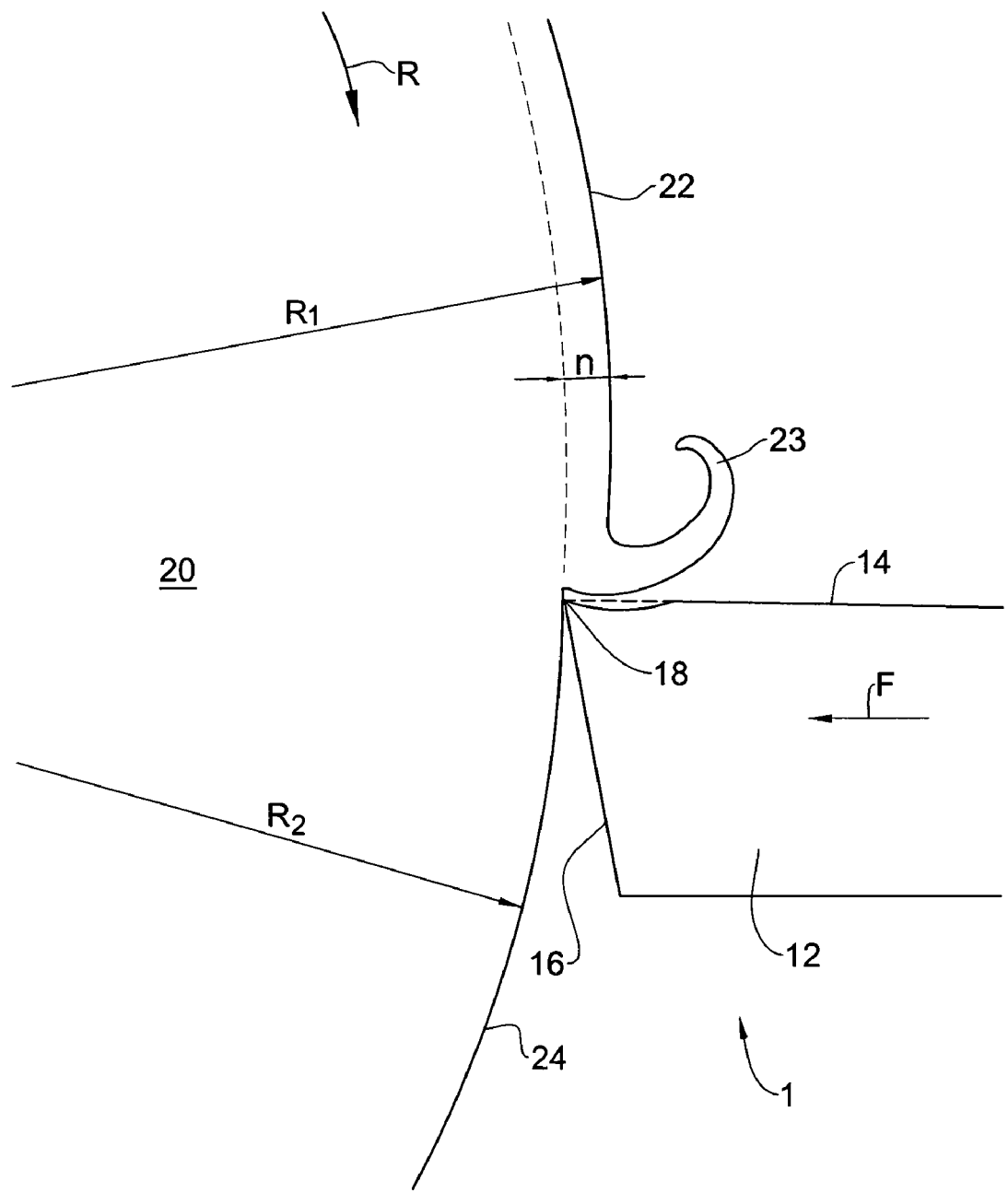
FIG. 1A is a schematic side view of a conventional cutting element during a turning operation on a workpiece.

With reference to FIG. 1A, a turning cutting tool according to the prior art, generally designated 1 is shown in contact with a workpiece 20 rotating in the direction of arrow R (CW) during feed F. The cutting tool 1 has an essentially rectangular cross section 12, and is formed with a rake surface 14 and a relief surface 16 defining at the intersection thereof a cutting edge 18.

In operation, the cutting tool 10 is adapted to be displaced in the feed direction F to come in contact with the workpiece 20 and cut a pre-chipped surface 22 thereby removing a chip 23 of thickness n therefrom, and form a chipped surface 24 thereafter, whereby the radius of the workpiece 20 is reduced from $R_1$ to $R_2$, such that $R_1 - R_2 = u$.

Figure 1B:
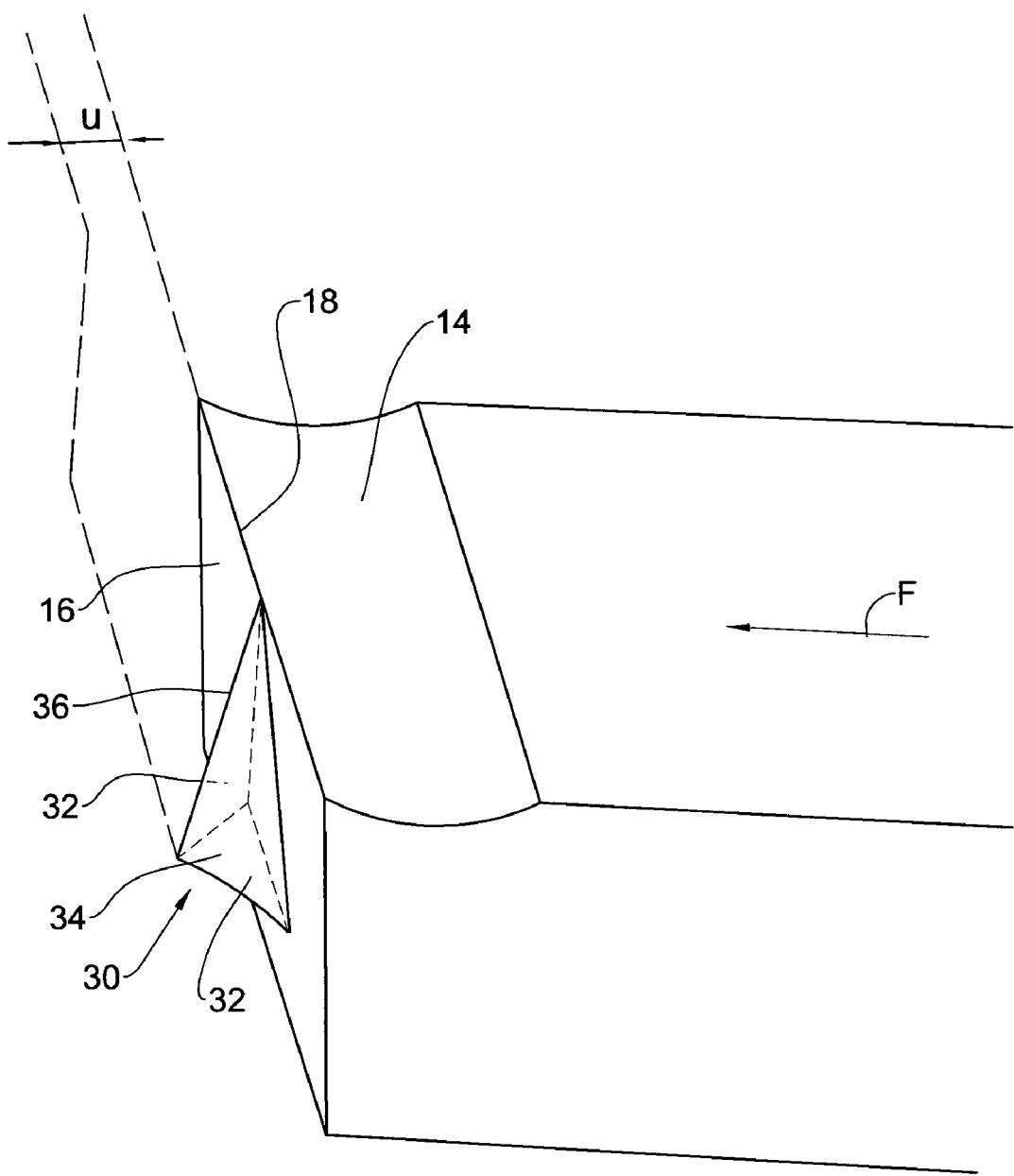
FIG. 1B is a schematic isometric view of a cutting element for a turning operation on a workpiece, according to one example of the present invention.

Turning to FIG. 1B, a cutting tool generally designated 10 is shown, adapted to be used for turning, and having a similar construction to the cutting tool 1 shown in FIG. 1A. However, the cutting tool 10 further comprises a deforming protrusion 30 formed on the relief surface 16 and extending between a first end 30a located adjacent the cutting edge 18 and a second end 30b spaced therefrom.

The deforming protrusion 30 is essentially pyramidal and formed of two angled surfaces 32 and a back face 34. The intersection between the angled surfaces 32 forms a ridge 36 which protrudes from the relief surface 16 and has an extension in a direction normal thereto, such that it protrudes to an extent u from the cutting edge 18, wherein upon contact between the cutting edge 18 and the workpiece 20, a contact may also be provided between the ridge 36 and the workpiece 20.

Figure 1E:
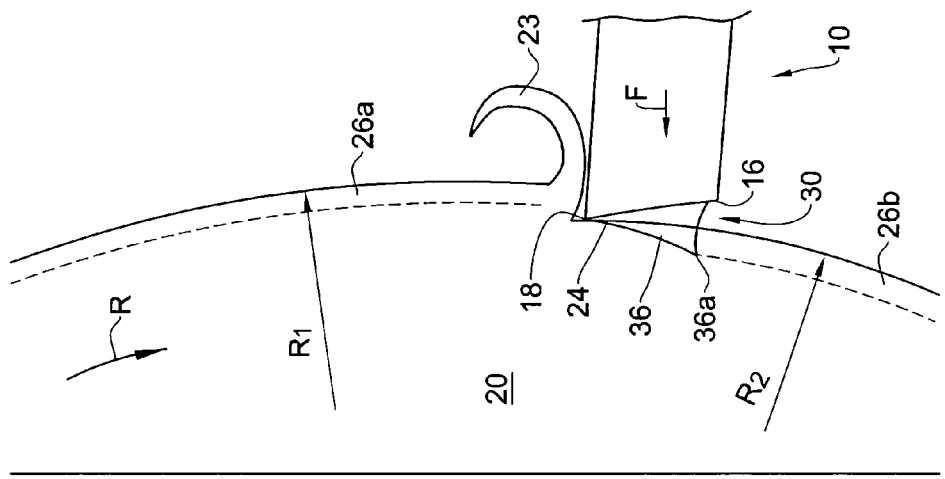
FIGS. 1C to 1E are schematic side views of the turning element shown in FIG. 1B, during different stages of the turning operation.
Figure 1D:
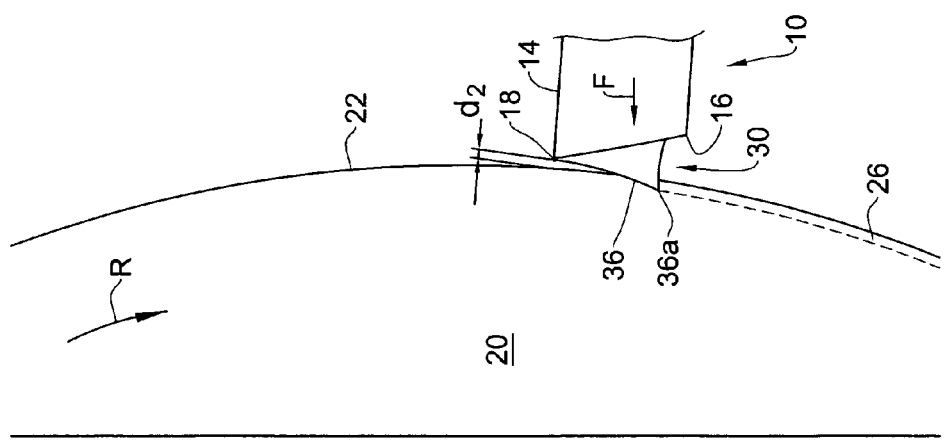
Figure 1C:
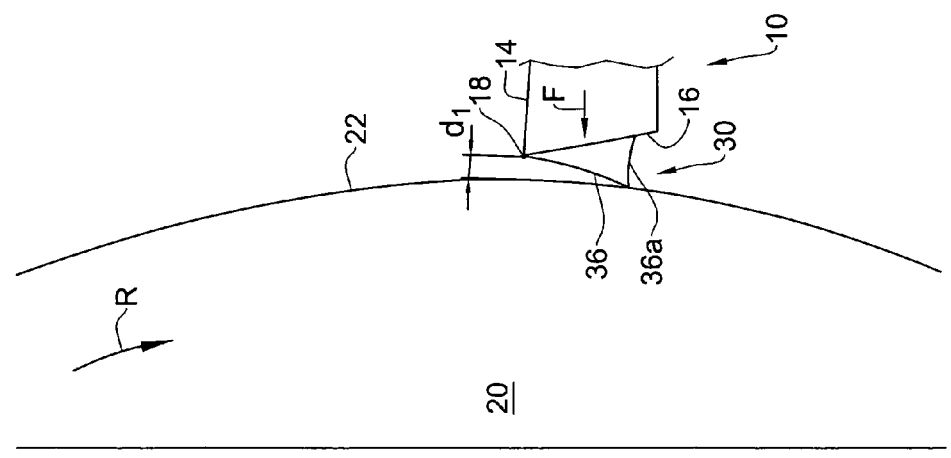

With reference to FIG. 1C, in operation, the workpiece 20 is set in rotary motion in direction of arrow R, and the cutting tool 10 is displaced towards the workpiece 20 in a feed direction F. Due to the ridge 36 protruding from the relief surface 16, it will be the first to come in contact with the workpiece 20 as shown in FIG. 1C. In this position, the tip 36a of the ridge 36 comes in contact with the workpiece 20 while the cutting edge 18 is spaced at a distance $d_1$ from the workpiece 20.

With reference to FIG. 1D, upon further displacement of the cutting tool 10 in the feed direction F, the protrusion 30 begins deforming the outer surface 22 of the workpiece 20 to form a groove therein, thereby producing a degraded surface 26. In this position, a distance $d_2$ still exists between the cutting edge 18 and the workpiece, however, obviously smaller than the distance $d_1$.

With reference to FIG. 1E, upon further displacement of the cutting tool 10 in the feed direction F, the cutting edge 18 comes in contact with the workpiece and begins removing a chip 23 from the degraded surface 26a of the workpiece 20, thereby reducing the radius thereof from $R_2$ to $R_1$. In other words, the cutting edge 18 'peels off' the degraded surface and produces a regular surface 24 of the workpiece, which is then immediately deformed by the protrusion 30 and the entire process repeats itself.

However, since the cutting edge 18 continuously comes in contact with a degraded surface, the force required to remove the chip 23 from the workpiece is substantially lower in comparison with that required to remove a chip from a non-degraded surface 22. Consequently, the loads applied to the cutting tool 10 and the cutting edge 18, are substantially lower.

Figure 1F:
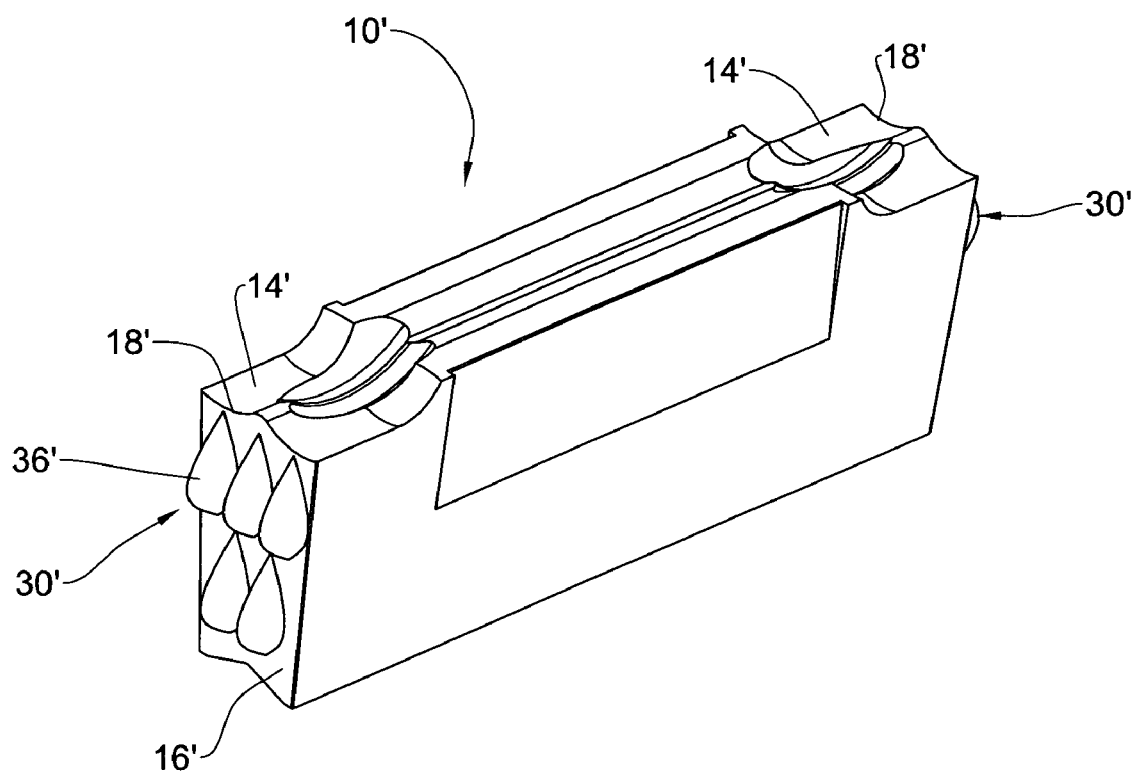
FIG. 1F is an isometric view of a cutting element for grooving and parting operations, according to another example of the present invention.

With reference to FIG. 1F, a cutting insert adapted for grooving and parting operations generally designated 10' is shown. The cutting tool 10' has an essentially narrow, and is formed with a rake surface 14' and a relief surface 16', defining at the intersection therebetween a cutting edge 18'. The relief surface 16' is formed with protrusions 30' having a 'drop' shape and a ridge 36'. The cutting insert is adapted to work in a similar manner to that described with reference to FIGS. 1C to 1E. According to a specific embodiment, said cutting insert 10' may be provided with only one row of protrusions 30'.

Figure 2A:
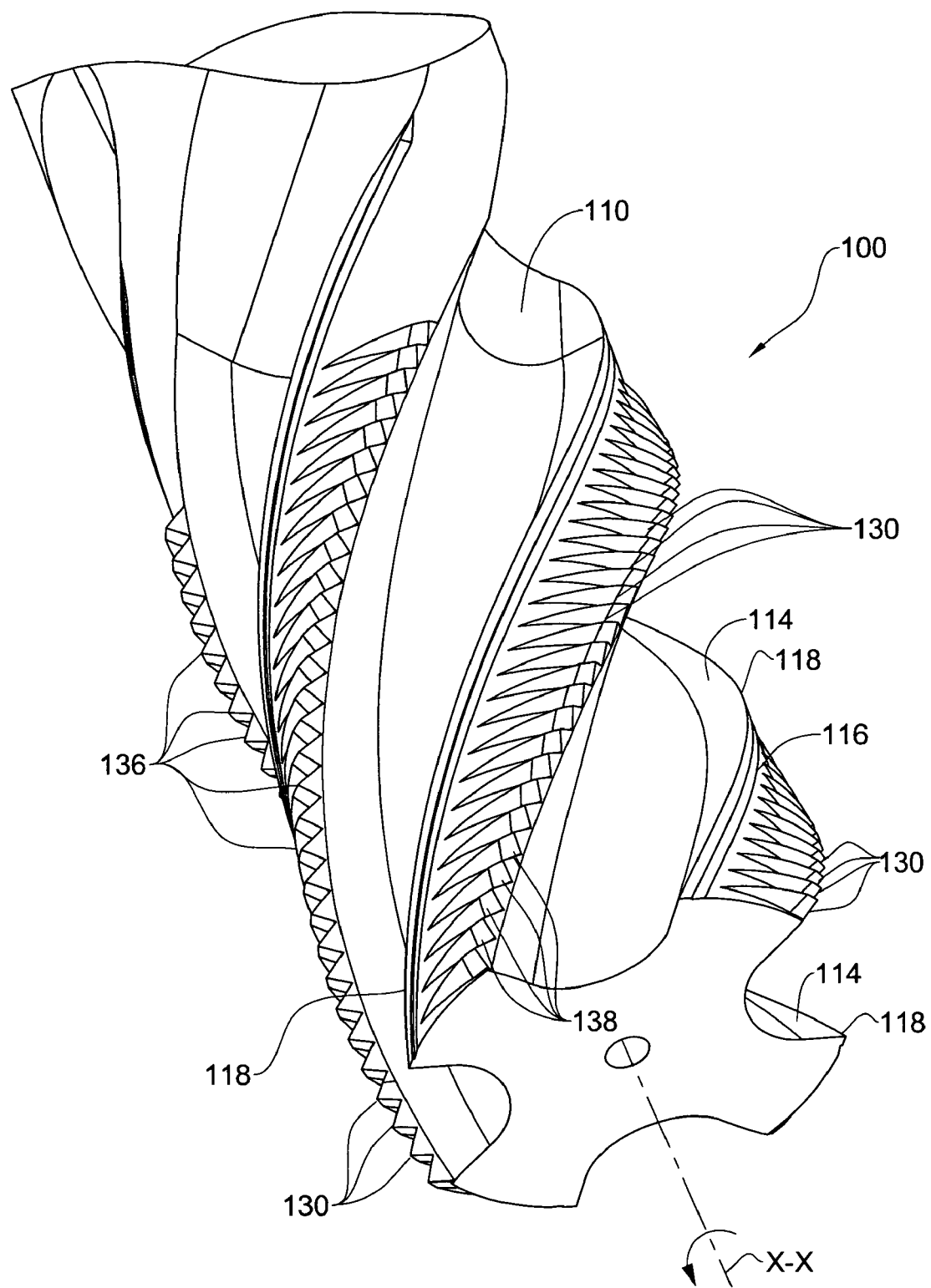
FIG. 2A is a partial isometric view of a milling head according to further example of the present invention.

Turning to FIG. 2A, a milling head generally designated as 100 is shown adapted to rotate about and axis X-X, and comprising four cutting edges 118, defined by corresponding rake and relief surfaces 114, 116 respectively. Between the cutting edges 118, channels 110 are formed, adapted to evacuate chips removed from the workpiece 20. Each of the relief surfaces 116 is formed with a plurality of deforming protrusions 130 each being formed with a ridge 136. The plurality of deforming protrusions 130 causes 'valleys' 138 to be formed between each two adjacent protrusions 130. The protrusions 130 are adapted to deform the surface of the workpiece 20 as previously described.

Figure 2B:
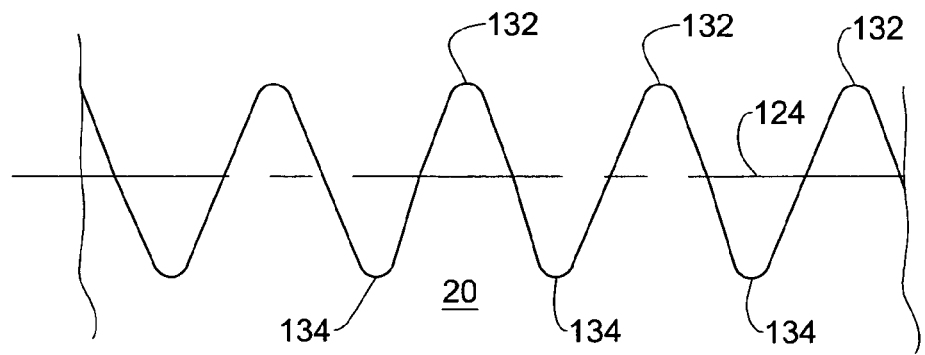
FIG. 2B is a schematic representation of the pattern formed on a workpiece by protrusions on the milling head shown in FIG. 2A.

With reference to FIG. 2B, after passing the cutting edge 118, a chip is removed from the workpiece 20 to form a chipped surface 124 (marked as the phantom line). Upon contact of the chipped surface 124 with the deforming protrusions 130, the chipped surface 124 is deformed to have a pattern of crests 132 and troughs 134. It should be emphasized here that the protrusions 130 do not remove material from the workpiece 20, rather the ridges 136 carve into the workpiece 20 to deform the material thereof and push it outwards to have a greater radial extension than the chipped surface 124. In other words, the ridges 136 penetrate into the workpiece 20, deforming the material into the valleys 138, so as to form the crests 132.

Turning to FIG. 5A, a rough milling head, generally designated as 190, is shown comprising six undulating cutting edges 198 defined by corresponding rake and relief surfaces 194 and 196 respectively. Each cutting edge has a 'peak' 198p and 'valley' 198v shape, whereby the relief surface 196 is also of a corresponding shape. On each relief surface 196, a plurality of deforming protrusions 200 is formed, one protrusion 200 being positioned between each two peaks 198p of the cutting edge 198.

Figure 5B:
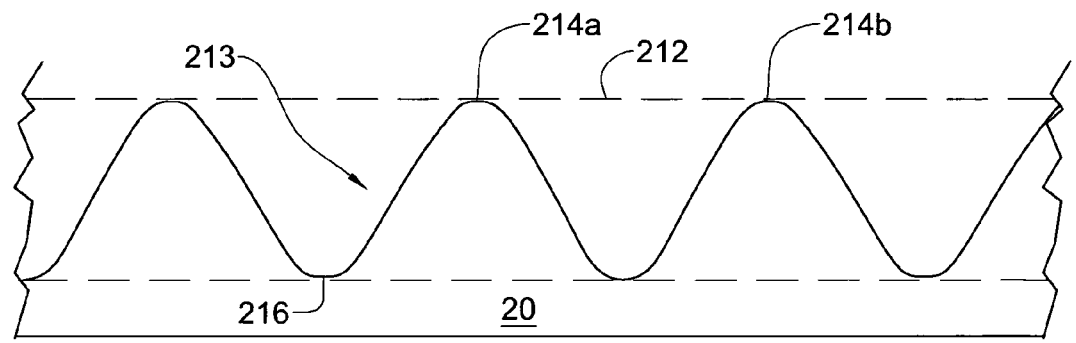
FIG. 5B is a schematic representation of the pattern formed on a workpiece as a result of removing chips therefrom using the rough milling head shown in FIG. 5A.
Figure 5C:
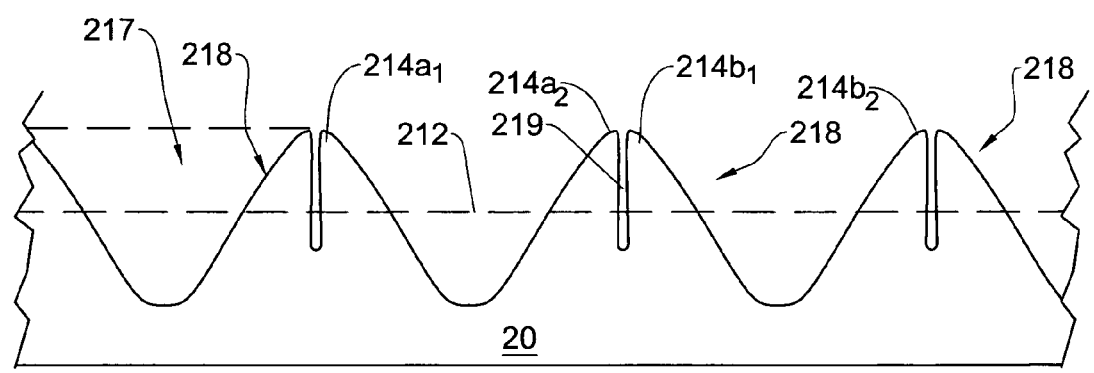
FIG. 5C is a schematic representation of a pattern produced on the workpiece having the pattern shown in FIG. 5B, by protrusions on the rough milling head shown in FIG. 5A.
Figure 5D:
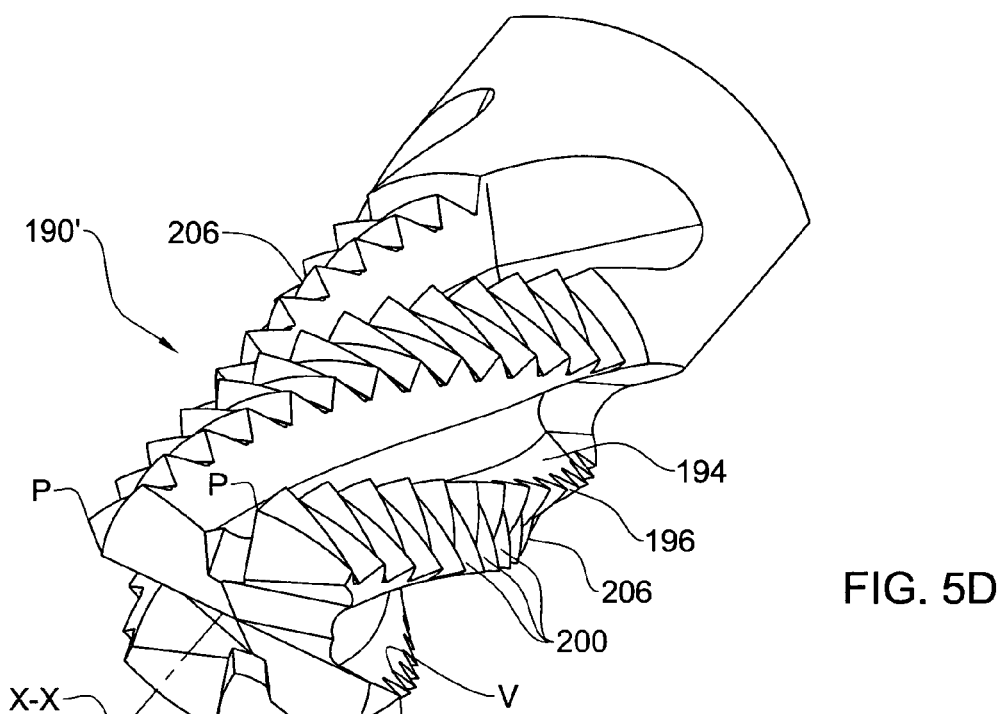
FIG. 5D is an isometric view of a rough milling head according to a further embodiment of the present invention.
Figure 5E:
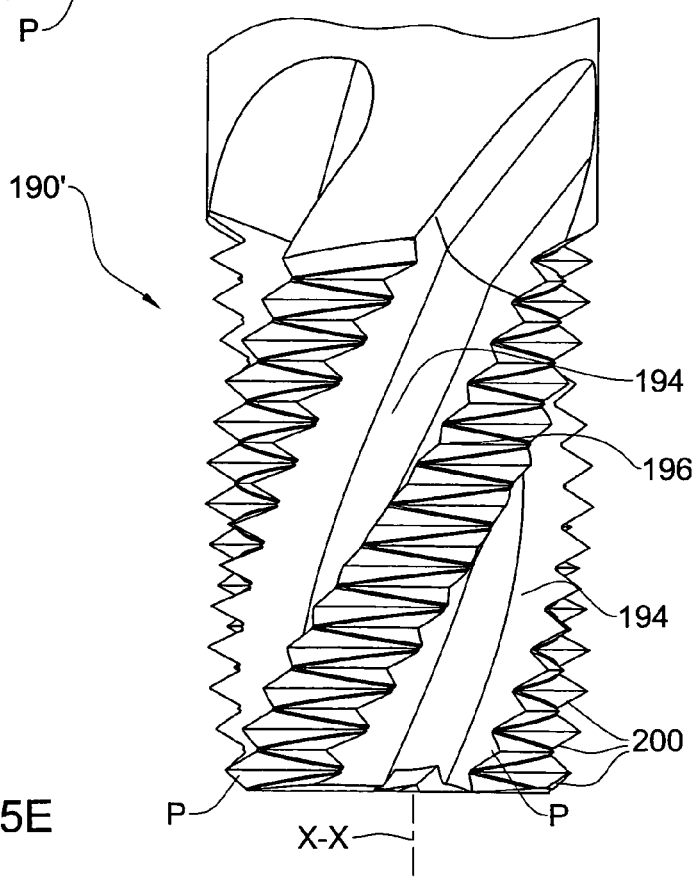
FIG. 5E is a front view of the rough milling head of FIG. 5D.

Turning now to FIGS. 5D and 5E, a different design of the milling head 190' is shown comprising four undulating cutting edges 198 defined by corresponding rake and relief surfaces 194 and 196 respectively. The design of the milling head 190' is similar to the design of milling head 190 with the difference being that the peaks of each of the undulating cutting edges 198 are aligned, i.e. all cutting edges 198 begin with a peak P.

It would also be appreciated that according to the above design, each of the undulating cutting edges 198 removes a new layer of material from the workpiece, i.e. in one turn of the milling head, four layers of material are removed. This is contrary to milling heads known in the art in which two undulating cutting edges are required to remove a single layer of material, whereby a similar milling head would only be able to remove two layer of material under the same cutting conditions (feed and rotation).

With reference to FIGS. 5B and 5C, in operation, the peak and valley cutting edges 198a remove chips from a workpiece 20, leaving a chipped surface 213 with a corresponding peak 214 and valley 216 marks thereon. The line 212 denotes the external circumference of the workpiece 20 before a cutting edge 198 has removed a chip from the workpiece 20. When the chipped surface 213 comes in contact with the deforming protrusions 200, a ridge 206 of each of the protrusions 200 'splits' the peaks 214 to form a degraded surface 217.

In particular, observing peaks 214a and 214b, each of the peaks 214a, 214b is split into two semi-peaks, $214a_1$, $214a_2$, $214b_1$, and $214b_2$ respectively. By virtue of the force applied to the surface 213 by the deforming protrusions 200, the semi-peak $214a_1$ is displaced to the right, while semi-peak $214b_2$ is displaced to the left, together forming a new peak 218 having a slit 219 at the middle thereof.

It would also be mentioned here that the peaks and valleys 198p and 198v of the cutting edge 198 may be shifted from one cutting edge to another, i.e. observing surface A, the cutting edge 198a may begin with a peak P, the cutting edge 198b may begin with a valley P and the cutting edge 198c may again begin with a peak P and so on. A variety of shifts may be used according to the specific desired chipping operation It would be appreciated, that the degraded surface 217 is deformed to such an extent that the load it may apply to the cutting edge following cutting edge 198b. In addition, since the deforming protrusions 200 are formed between the peaks 194p of the cutting edges 198, the peaks 198p of the cutting edge 198b come in contact with the peaks 218 of the surface 217, further reducing the load on the cutting edge 198.

Figure 5F:
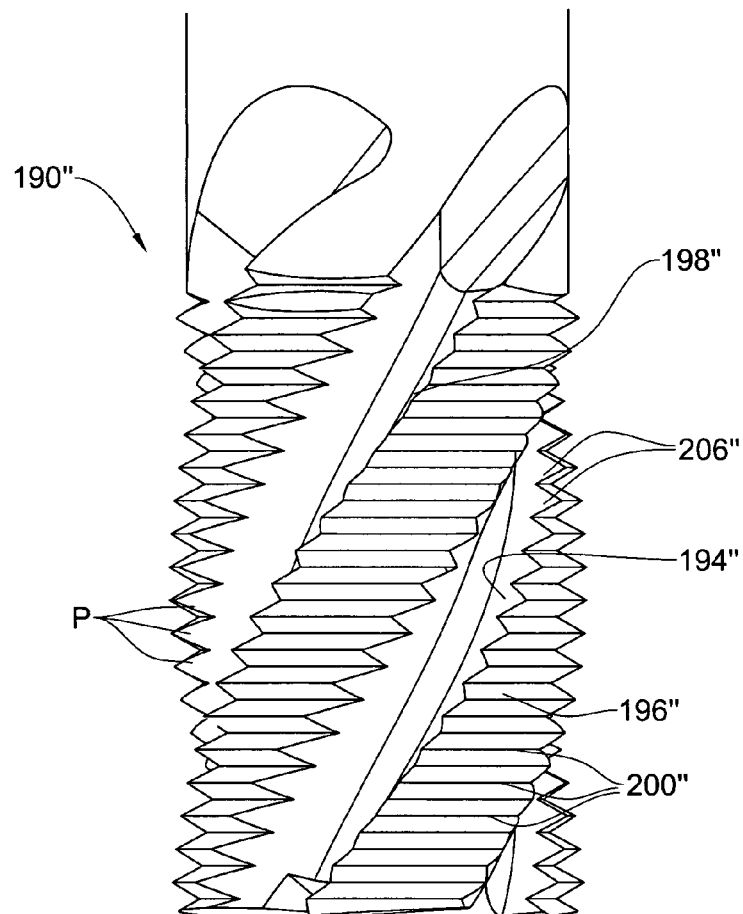
FIG. 5F is a front view of a rough milling head in accordance with still a further embodiment of the present invention.
Figure 5G:
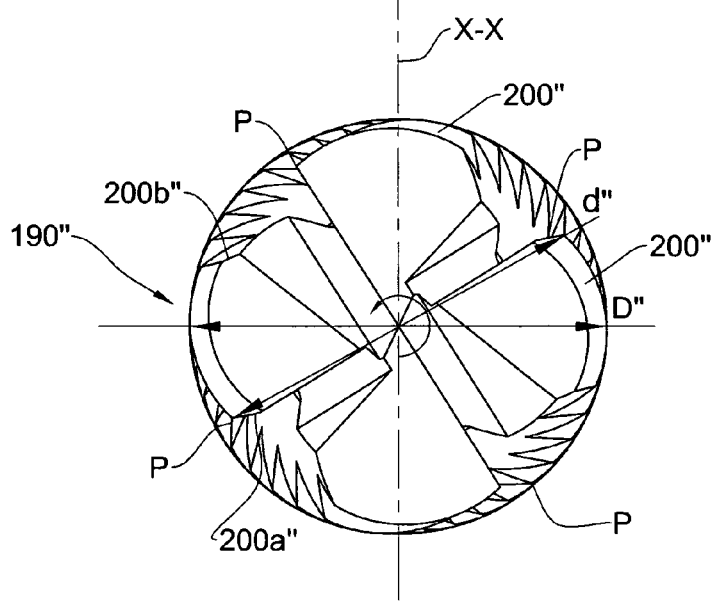
FIG. 5G is a bottom view of the rough milling head of FIG. 5F.

Attention is now drawn to FIGS. 5F and 5G, in which another design variation of a milling head 190" is shown. The milling head 190" is formed with several four undulating cutting edges 198", each cutting edge 198" having a shape of peaks P and valleys V similar to the previous embodiments. Each peak P of the cutting edge 198" is associated with a ridge 206", essentially forming a protrusion 200".

However, according to the present design, each protrusion 200" is formed such that the radial extension from the central axis X-X of a front portion 200a", located in the vicinity of the cutting edge 198", is smaller than the radial extension of a back portion 200b", spaced from the cutting edge. In other words, two diameters may be defined: a first diameter d" denoting the diameter of the enveloping circumference defined by the front portion 200a" of the protrusion 200" at the cutting edge 198", and a second, larger diameter D" denoting the diameter of the enveloping circumference defined by the back portion 200b" of the protrusion 200" circumferentially spaced from the cutting edge 198".

During operation of the milling head, the front portion 200a" of the protrusion 200" performs the removal of the chip from the workpiece (not shown) forming a trough therein, while immediately thereafter, the back portion 200b" of the protrusion 200" penetrates deeper into the trough and deforms the workpiece, preparing it for the following cutting edge 198".

This design variation may offer, inter alia, several additional advantages including cost effective manufacturing due to the simple design, low resistance during chipping due to the uniform direction of the protrusions 200", etc.

Figure 3:
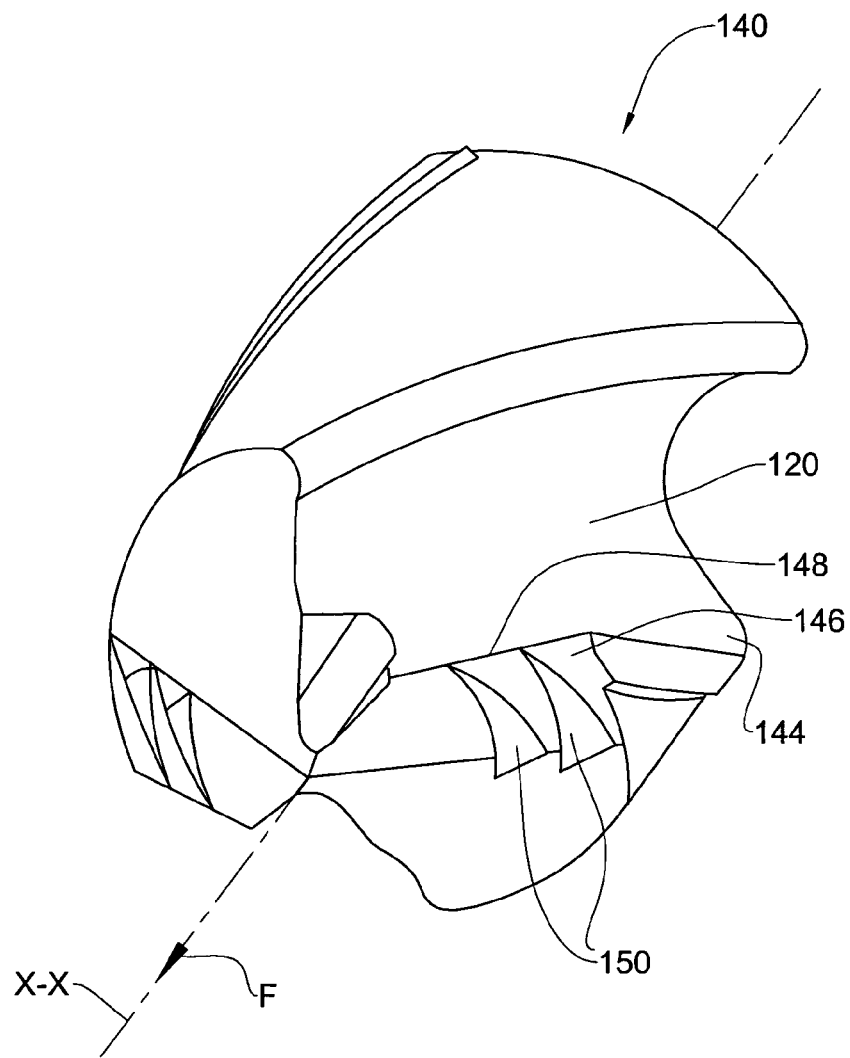
FIG. 3 is a partial isometric view of a drill head according to yet another example of the present invention.

Turning to FIG. 3, a drill head 140 is shown adapted to rotate about an axis X-X, which also denotes the feed direction F, to drill a hole in a workpiece or surface (both not shown). The drill head 140 comprises two cutting edges 148 defined by corresponding rake and relief surfaces 144, 146 respectively. The drill head 140 is also formed with two chip evacuating channels 120. Each relief surface 146 is formed with two crescent shaped deforming protrusions 150. The protrusions 150 are adapted to deform the surface of a workpiece perpendicular to the axis X-X, in contrast to the milling head 110 previously discussed, in which the protrusions 130 are adapted to deform the surface extending circumferentially about the axis X-X.

Figure 4:
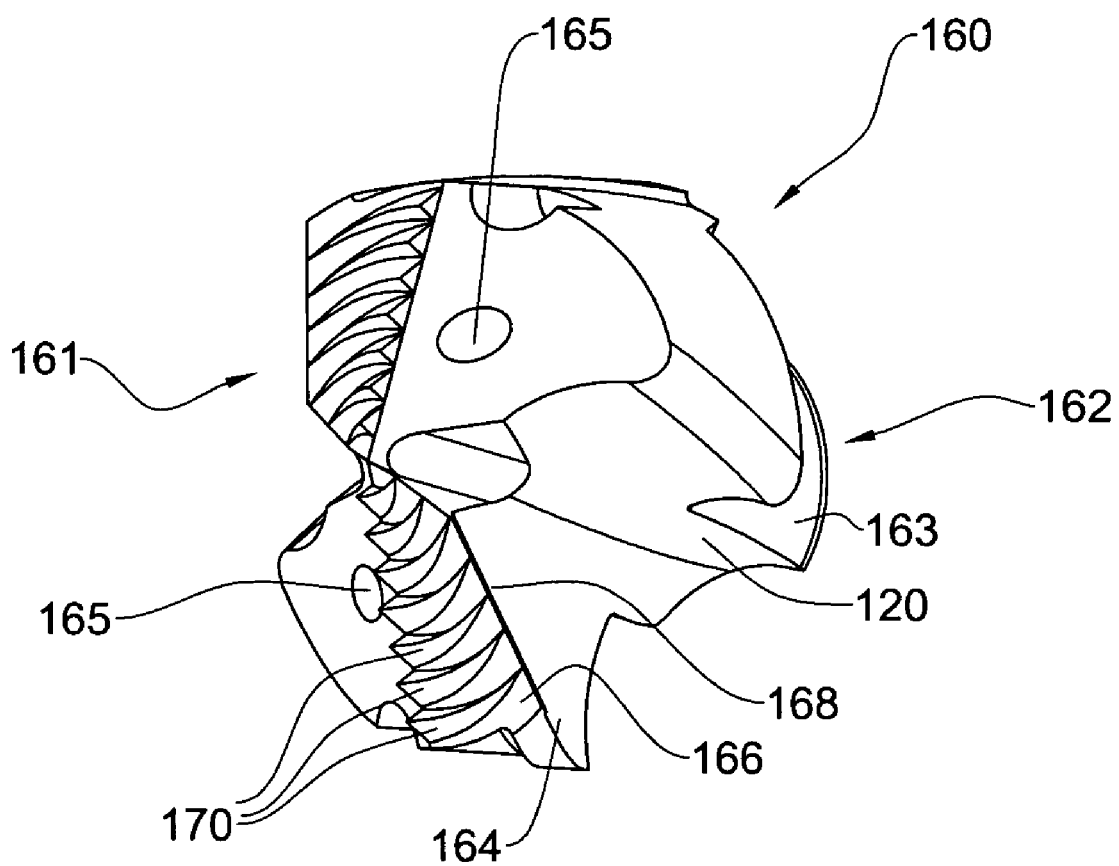
FIG. 4 is an isometric view of a drill insert according to a further embodiment of the present invention.

Turning to FIG. 4, a drill insert 160 is shown adapted to be inserted into a drill head (not shown). The drill insert 160 is formed with a drill portion 161 adapted to remove material from a surface, and a mounting portion 162 adapted for attachment to the drill head.

The drill portion 161 is formed with two cutting edges 168 defined by corresponding rake and relief surfaces 164 and 166 respectively, and two evacuation channels 120 adapted to evacuated chips from the workpiece (not shown). Each relief surface 166 is formed with a plurality of deforming protrusions 170, each being formed with a ridge 176. The mounting portion is formed of a base 163 adapted to be inserted into a seat of the drill heat. The drill insert 160 is further formed with two holes 165 adapted to provide a cooling liquid therethrough.

Figure 6A:
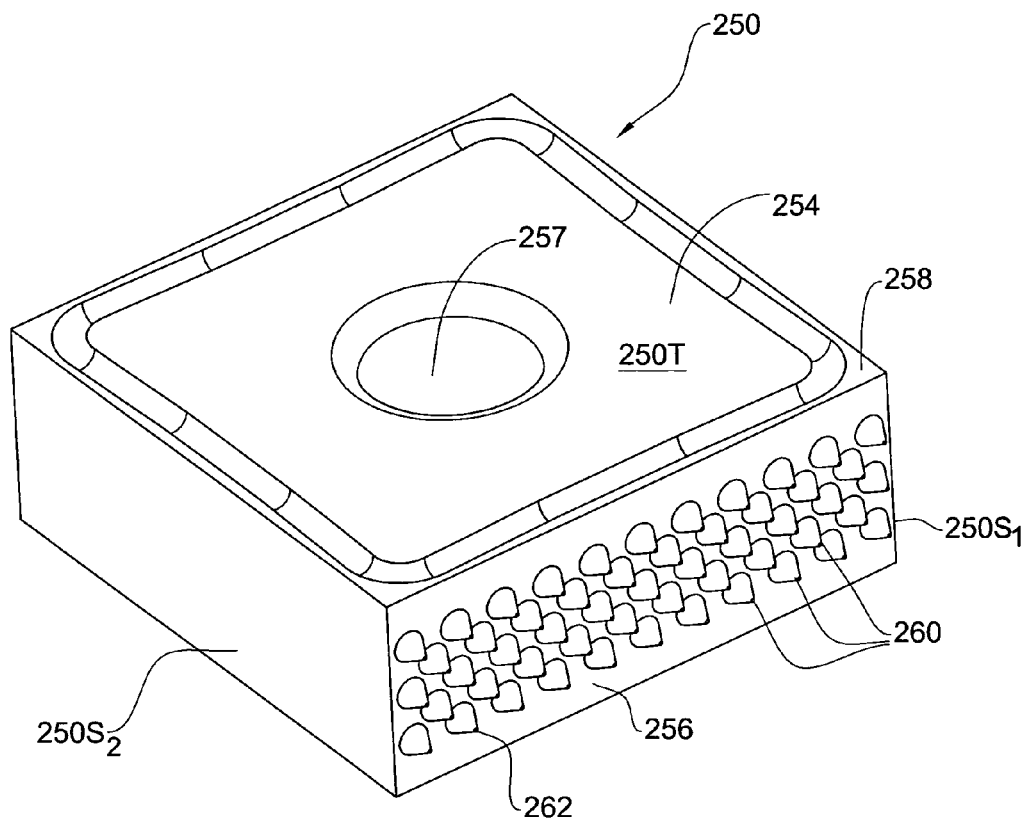
FIG. 6A is an isometric view of a cutting insert for a turning operation, according to yet a further example of the present invention.
Figure 6B:
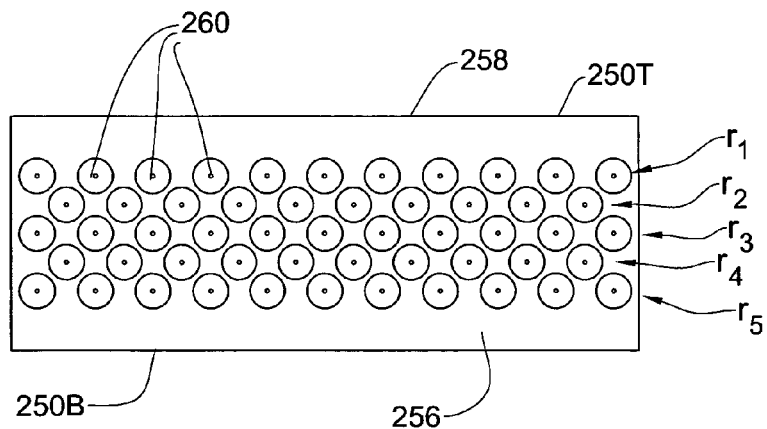
FIG. 6B is a front view of the cutting insert shown in FIG. 6A.

Turning to FIGS. 6A to 6B, a cutting insert 250 is shown having an essentially rectangular form, with a top face 250T, a bottom face 250B, sidewalls $250S_1$ and sidewalls $250S_1$. The sidewalls $250S_1$ constitute relief faces 256 of the insert 250, and the top face 250T constitutes the rake face 254. The cutting edge 258 is defined between the rake face 254 and the relief faces 256. The cutting insert 250 further comprises an array of deforming protrusions 260 arranged along the relief faces 256 of the insert 250, each protrusion being of essentially conical shape with a rounded tip 262. The protrusions 260 are arranged in five rows $r_1$ to $r_5$, slightly shifted from one another. The cutting insert 250 is further formed with a central bore 257 adapted to receive a screw during mounting of the insert 250 onto a tool-post (not shown).

Figure 6C:
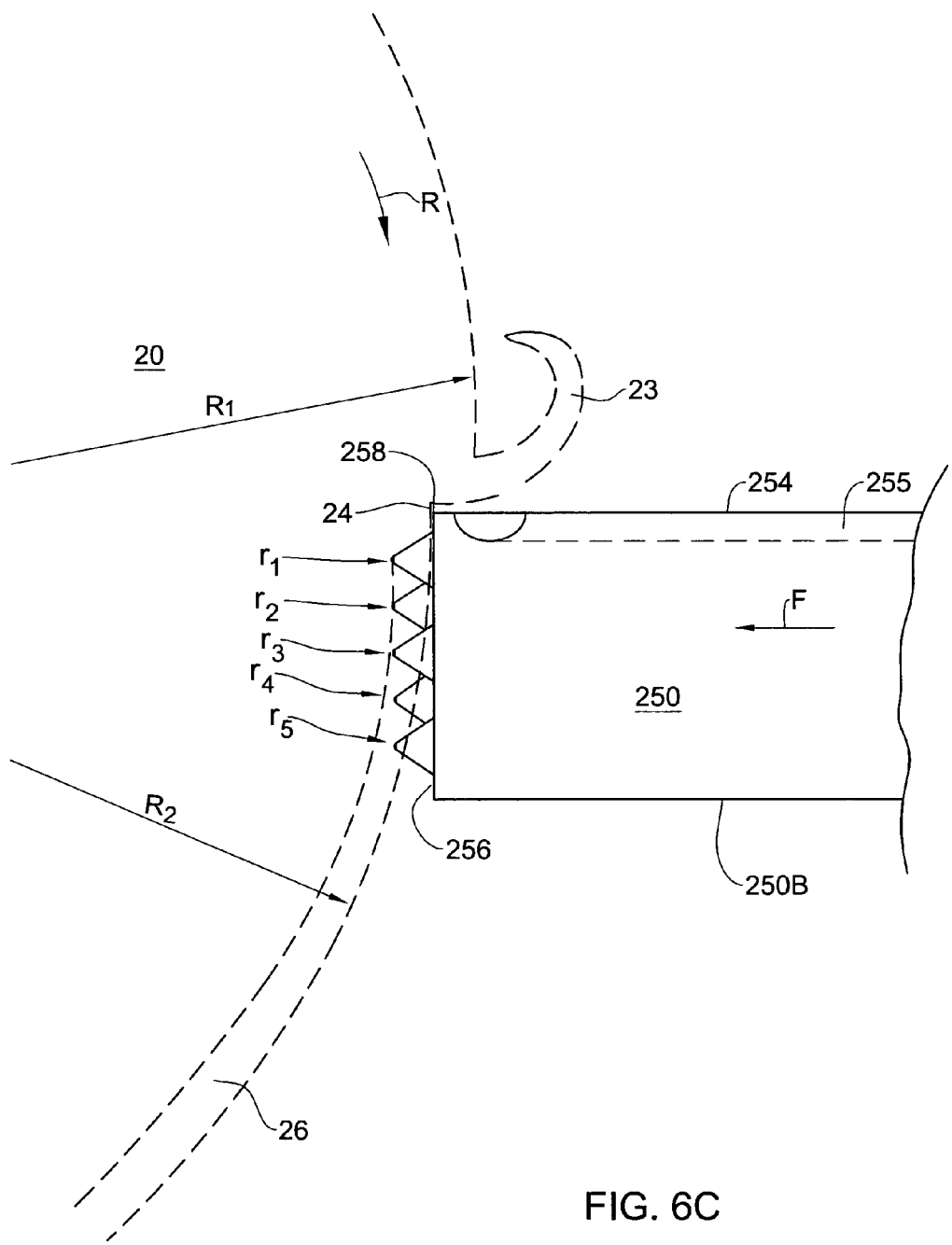
FIG. 6C is a side view of a cutting tool with the cutting insert shown in FIGS. 6A and 6B, during operation.

With particular reference to FIG. 6C, in operation, the workpiece 20 rotates in direction of arrow R (CW) and the pre-chipped surface 22 thereof of radial dimension $R_1$ contacts the cutting edge 258. Upon contact, a chip 23 is removed from the workpiece 20 and a chipped surface 24 is produced, having a smaller radial dimension $R_2$. Thereafter, the chipped surface 24 immediately comes in contact with the deforming protrusions 260 whereby it is deformed to produce a degraded surface 26 in a similar manner and form described with respect to FIGS. 1C to 1E, and 2B.

It would also be appreciated here that since all the protrusions 260 are of the same extension above the relief surface and the workpiece 20 revolves about its axis, the protrusions in the first row $r_1$ penetrate deeper into the workpiece 20 than the protrusions of the fifth row $r_5$, to gradually deform the surface 24. The protrusions of 260 of the first row $r_1$ perform most of the deformation, and as such, are exposed to the greatest amount of wear and tear. However, once the protrusions 260 of the first row $r_1$ are worn out, the protrusions 260 of the second row $r_2$ perform most of the deformation and so on.

Figure 7A:
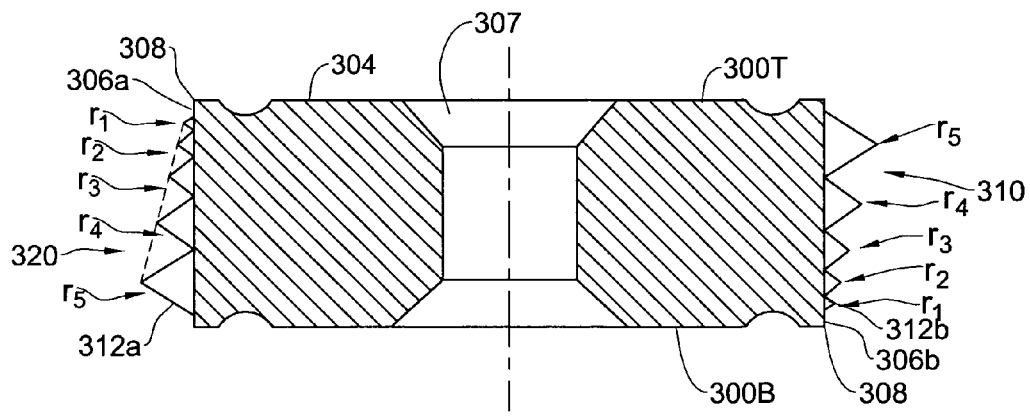
FIGS. 7A and 7B are schematic side and top views, respectively, of a cutting insert for a turning operation according to another example of the present invention.
Figure 7B:
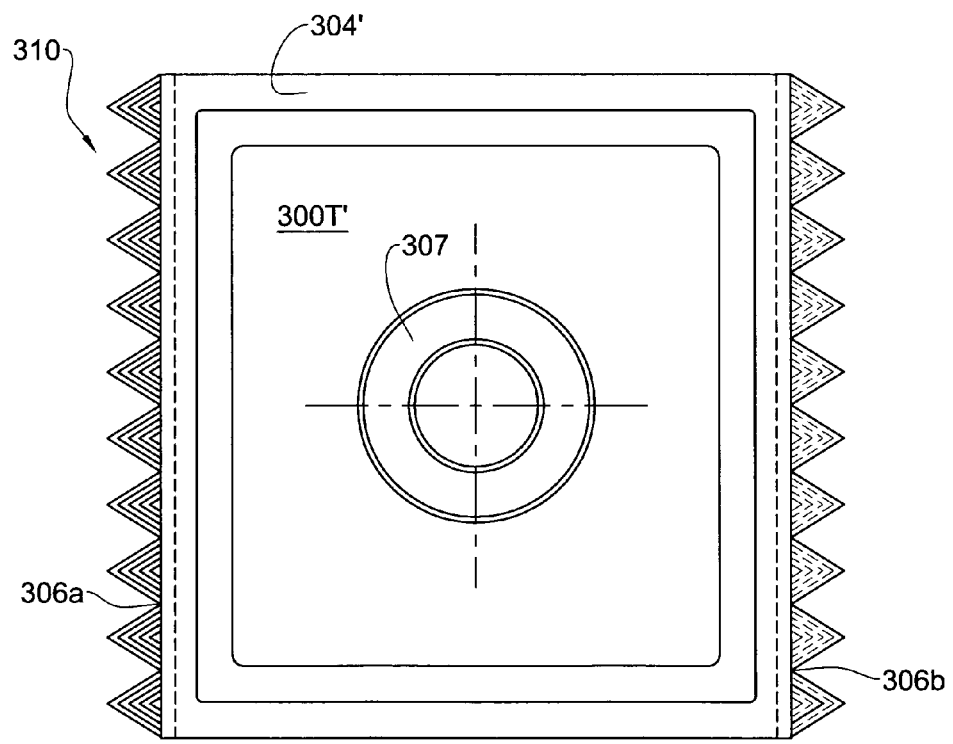

Turning to FIGS. 7A and 7B, a cutting insert 300 for a turning cutting tool (not shown) is shown having an essentially rectangular form and comprising top, bottom and side surfaces 300T, 300B, $300S_1$ and $300S_2$ constituting relief and rake surfaces 304, 306 similar to the described with respect to FIGS. 6A and 6B. The cutting insert 300 is formed with a cutting edge 308 defined between the relief 306 and rake 304 surfaces. The cutting insert is further formed with a central bore 307 adapted for mounting of the insert 300 onto a tool-post (not shown).

The cutting insert 300 also comprises five rows $r_1'$ to $r_5'$ of protrusions 310, of varying elevation above the relief surface 306, such that the first row $r_1$ has the lowest elevation, and the fifth row $r_5'$ has the highest elevation. Thus, the deformation of the workpiece 20 is gradual, whereby the vertexes of the conical protrusions 310 form a ridge shape 320, similar to that disclosed with respect to FIG. 1B. It would also be observed that the insert 300 has an inverse symmetry, i.e. the largest protrusion 312a on one relief surface 306a, is opposite the smallest protrusion 312b on the opposite relief surface 306b.

Figure 8A:
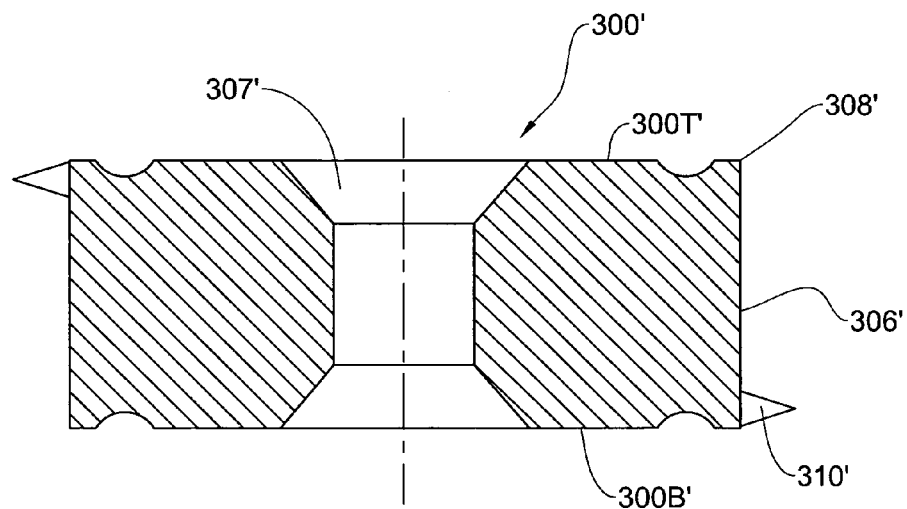
FIGS. 8A and 8B are side and top views, respectively, of a cutting insert for a turning operation according to yet another example of the present invention.
Figure 8B:
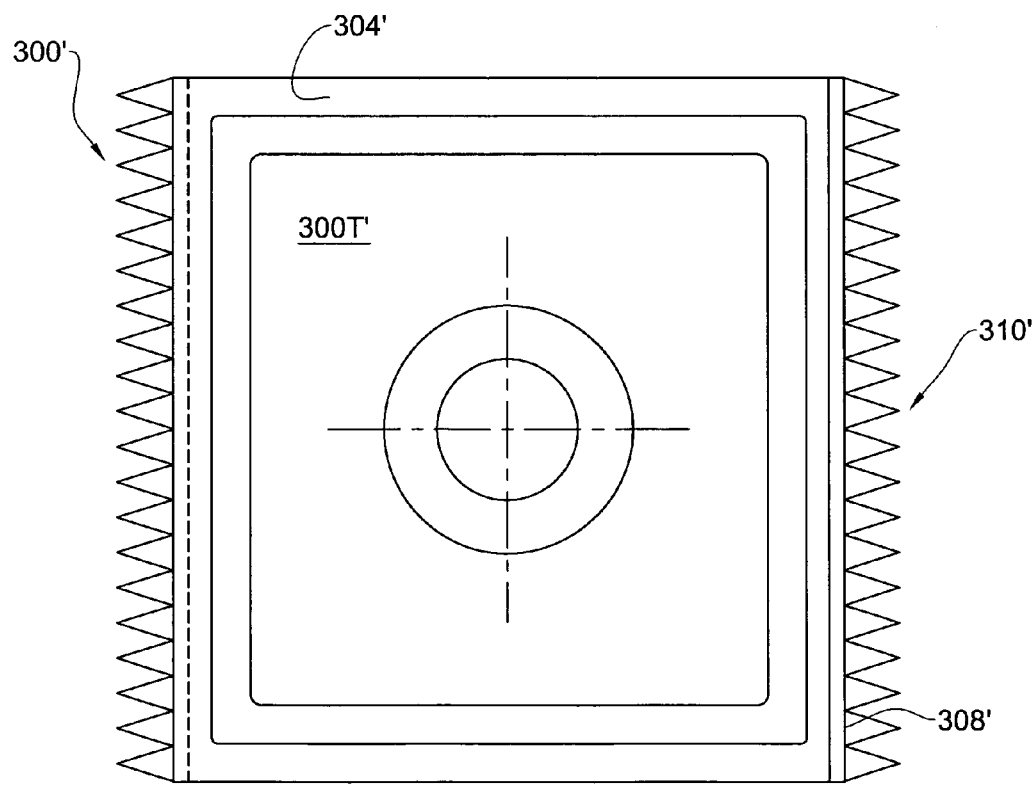
Figure 8C:
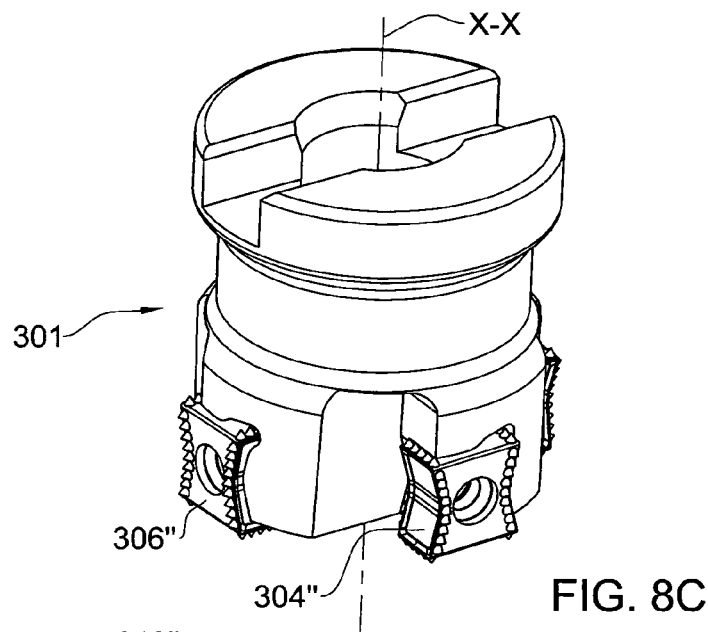
FIG. 8C is an isometric view of a milling head employing cutting inserts according to another embodiment of the present invention.
Figure 8D:
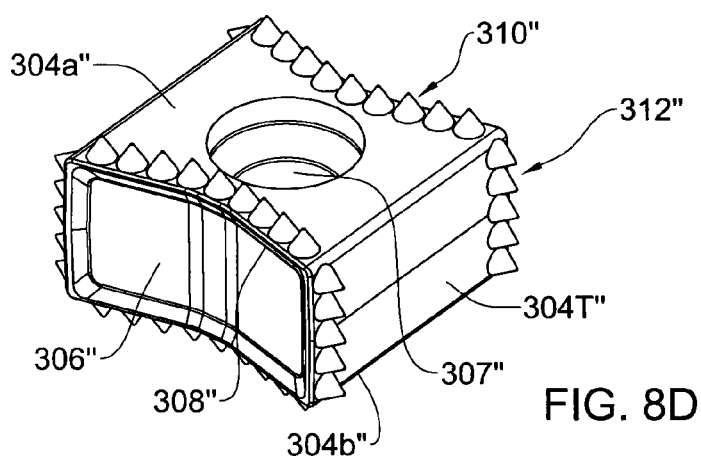
FIGS. 8D to 8F are isometric, top and front views of the cutting insert of FIG. 8C respectively.
Figure 8E:
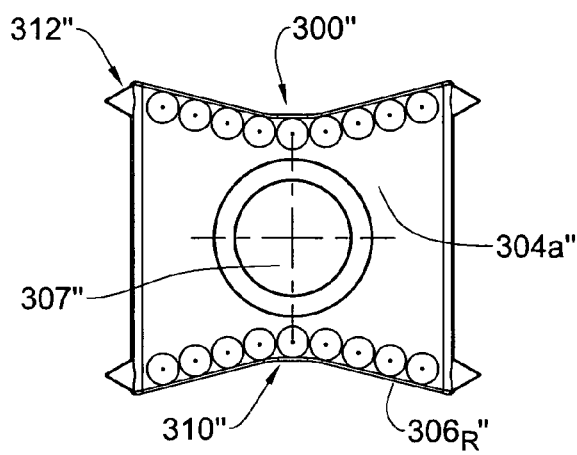
Figure 8F:
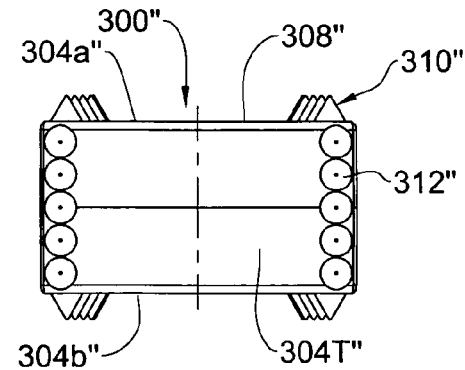

Turning to FIGS. 8A and 8B, another embodiment of an insert 300' is shown having an essentially similar construction to the insert 300 disclosed in FIGS. 7A and 7B, and the reference numerals are the same as on those figures with the addition of a prime. However, the insert 300' is formed with a single row of protrusions 310'. The insert 300' operates in essentially the same manner as insert 300.

Attention is now drawn to FIGS. 8C to 8F, in which a cutting insert 300" for a milling tool 301 is shown having a different design than the previously described embodiments. The cutting insert 300" is formed with front and rear rake surfaces 306F" and 306R", two side relief surfaces 304a" and 304b", and with top and bottom relief surfaces 304T" and 304B" respectively. A cutting edge 308" is defined between each of the rake and relief surfaces, allowing the cutting insert 300" to be reversible. The cutting insert 300" is further formed with a first set of protrusions 310" positioned on the side relief surfaces 304a" and 304b", and a second set of protrusions 312" formed on the top and bottom relief surfaces 304T" and 304B" respectively.

In operation, the cutting insert 300" works much the same way as previously described with respect to FIGS. 7A to 8B, wherein the two sets of protrusions 310" and 312" penetrate into the workpiece (not shown) both in the radial and axial directions.

Figure 9A:
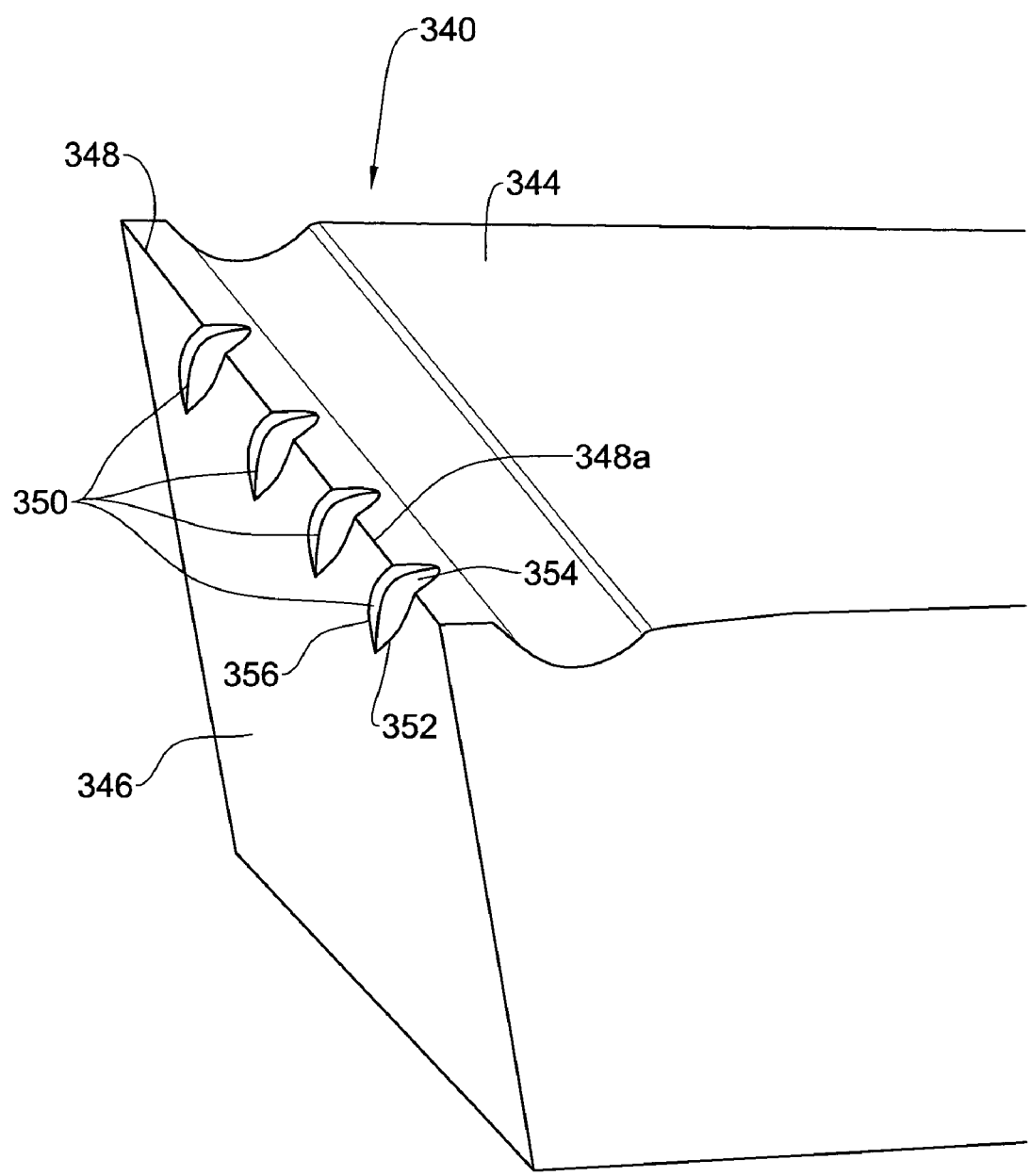
FIGS. 9A, 9B and 9C are isometric, front and top views, respectively, of a cutting insert according to still a further example of the present invention.
Figure 9B:
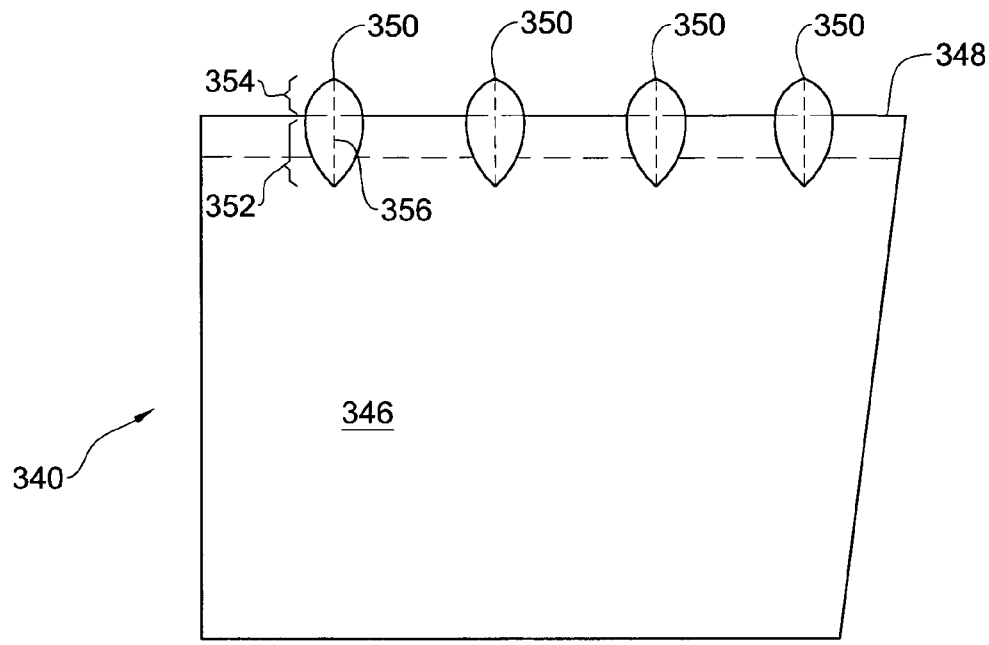
Figure 9C:
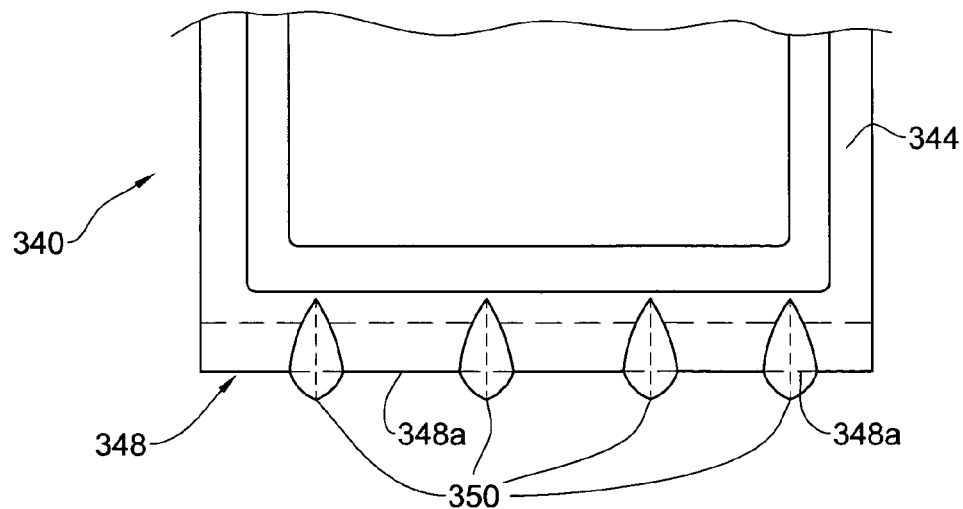

Turning to FIGS. 9A to 9C, another embodiment of a turning insert is shown, generally designated 340. The insert 340 is formed with a rake and relief surfaces 344, 346 respectively, similarly to the previous embodiments. The insert 340 also comprises four deforming protrusions 350, each having an essentially L shape. Thus, each protrusion 350 may be schematically divided into a relief portion 352 protruding from the relief surface 346, and a rake portion 354 protruding from the rake surface 344. Such a shape and positioning of the protrusions 350 provides high stability to the protrusions 350 since they are also supported by the rake surface 344. Each protrusion 350 is formed with a ridge 356 adapted to deform a workpiece (shown FIG. 10).

Figure 10:
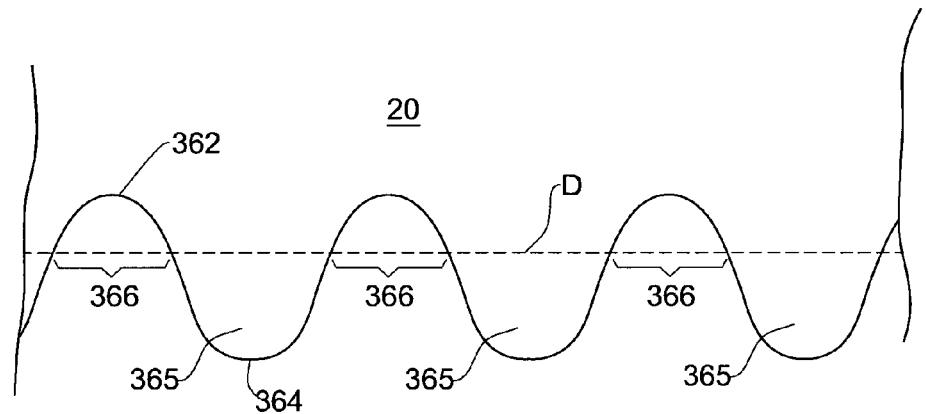
FIG. 10 is a schematic representation of the pattern formed on a workpiece by the insert shown in FIGS. 9A to 9C.

Due to the shape and location of the protrusions 350, portions 348b of the cutting edge 348 are partially obscured, leaving active portions 348a positioned therebetween adapted to remove a chip from the workpiece. With reference to FIG. 10, the workpiece 20 is shown after deformation thereof by the protrusions 350. The protrusions 350 leave a trough 362 and crest 364 pattern, wherein line D denoted the extension of the cutting edge 348. In operation, the feed F is such that the cutting edge 348 does not go as deep as the troughs 362, and is adapted to remove only the peaks 364 of the workpiece 20. Thus, the area of the troughs 362 does not come in contact with the cutting edge 348, whereby the portions 348b of the cutting edge 348 opposite the troughs 362 become essentially inactive. Very conveniently, these inactive portions 348b are exactly the ones constituted by the protrusions 350 adapted to deform the workpiece 20.

Turning now to FIGS. 9D to 9H, another embodiment of a cutting insert, generally designated 440 is shown. The insert 440 is formed with rake and relief surfaces 444, 446 respectively similarly to previous embodiments. In addition, the cutting insert 440 has four identical cutting edges 448, two on each side thereof, whereby each cutting edge may be indexed into its operative position when desired.

The insert 440 also comprises a plurality of deforming protrusions 450, each having an essentially elliptical shape in its cross-section perpendicular to the relief surface 446 of the insert. Each protrusion 450 may be considered as having a relief protrusion portion 452 protruding from the relief surface 446, and a rake protrusion portion 454 protruding from the rake surface 444. The cutting edge 448 of the insert 440 has cutting edge portions 448a, 448b etc., which have a concave shape if seen in the insert's plan view (FIG. 9F), allowing to reduce the load applied to the cutting edge 448 by the workpiece. In addition, concentration of loads on the ends of each cutting edge portions 448a, 448b, etc. is greatly reduced since instead of a sharp corner, the deforming protrusions provide the edge of the cutting insert 440 with a shape of a continuous undulating line.

It would also be noted that each cutting edge 448 extends between two cutting corners 448', which are rounded to allow smooth penetration into the workpiece. In order to further reduce the loads on the cutting insert 440, the tips 458 of the protrusions 450 are rounded to avoid stress accumulation.

Figure 9D:
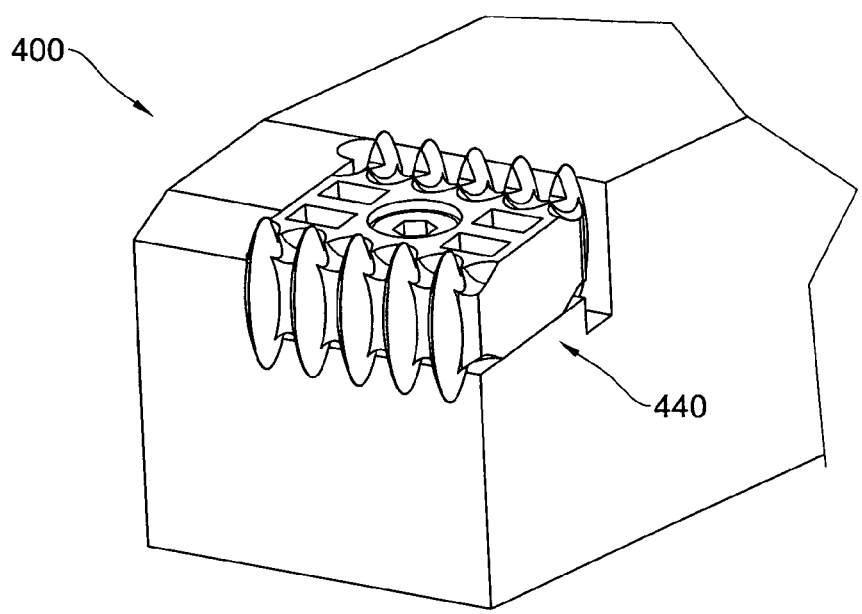
FIG. 9D is an isometric view of a turning tool with a cutting insert according to still a further embodiment of the present invention.
Figure 9E:
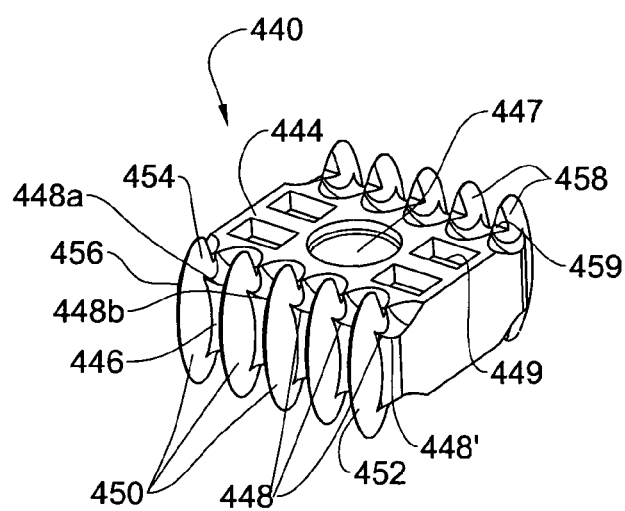
FIGS. 9E to 9H are isometric, top, side and front view of the cutting insert of FIG. 9D.
Figure 9F:
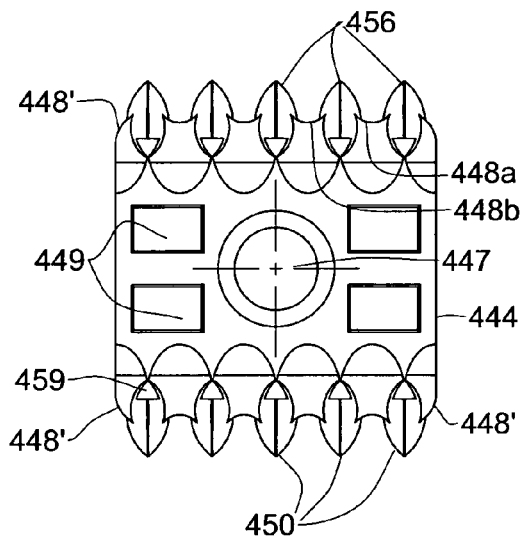
Figure 9G:
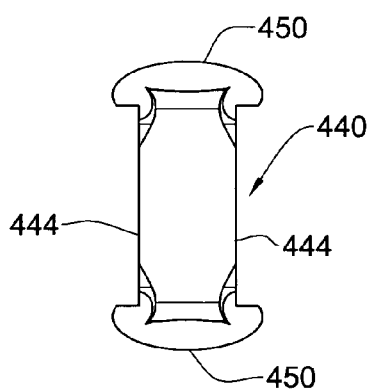
Figure 9H:
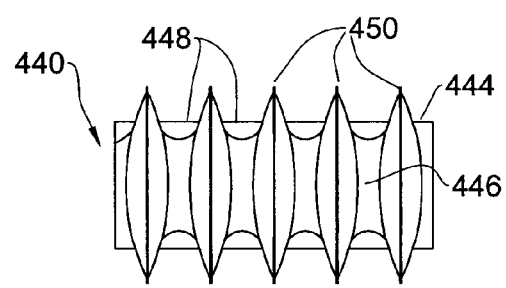

The cutting insert 440 is formed with a central bore 447 adapted to receive a fixation bolt therethrough for attachment to a work tool such as a turning tool 400 of FIG. 9D. In addition, the relief surface 444 of the cutting insert 400 is formed with four positioning recesses 449 adapted to receive therein corresponding protrusions (not shown) formed on mounting surface of a cutting insert seat in the turning tool 400. Furthermore the rake protrusion portions 450 opposite the ridge 456 are each formed with a cut-away surface 459 also adapted for contacting the mounting surface for secure positioning of the cutting insert on the turning tool 400. It would be appreciated from FIGS. 9F to 9H that the protrusions 450 protrude both normal to the relief surface 444, i.e. in the feed direction, and normal to the rake surface 446. This is in complete contrast to cutting inserts known in the art, in which the relief surface is specifically designed to avoid any contact with the workpiece.

Figure 9I:
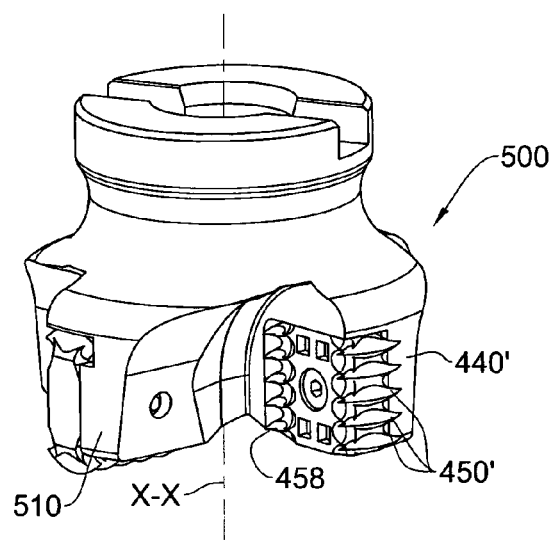
FIG. 9I is an isometric view of the cutting insert of FIGS. 9E to 9H when employed in a milling head.

With reference to FIG. 9I, a modification of the cutting insert 440' is shown adapted for use in a milling head 500. The milling head 500 is formed with a plurality of insert seats 510, each adapted to receive a cutting insert 440'. The cutting insert 440' is similar to cutting insert 440 previously described.

For the purpose of illustration, the cutting inserts 440' are shown with the tips 458' of their protrusions 450' being not rounded but rather sharp, though this clearly does not necessarily has to be the case.

Figures 11A, 11B:
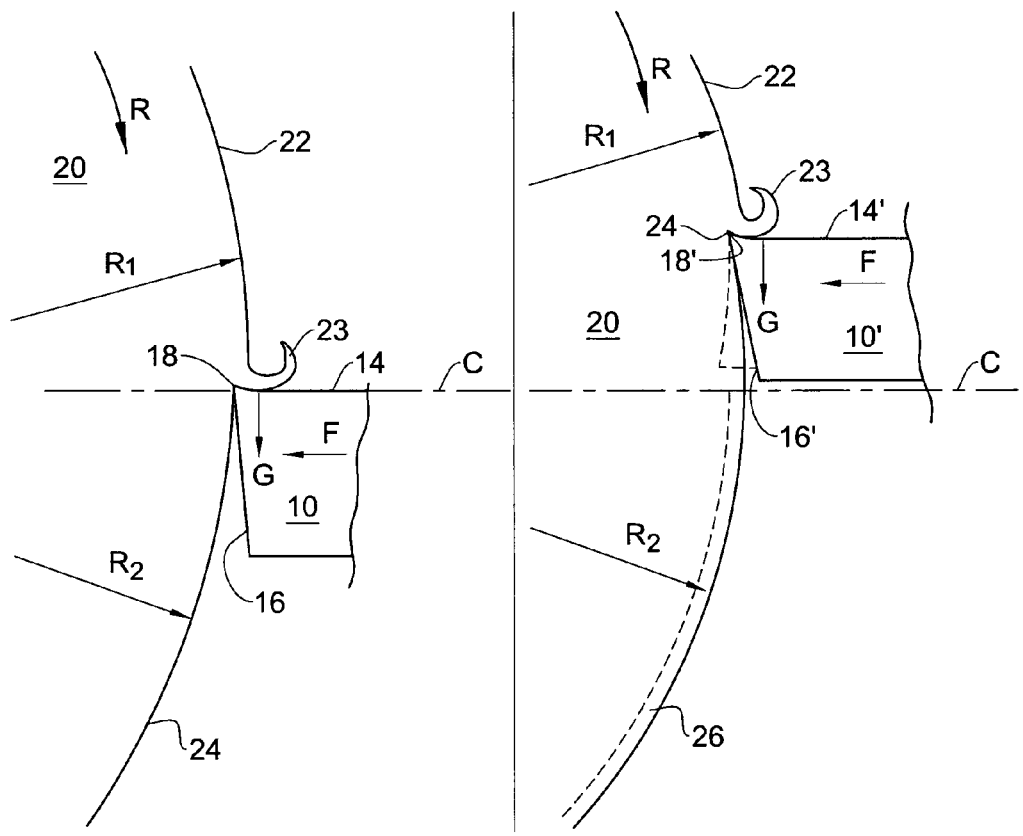
FIG. 11A is a schematic representation of a turning insert during a conventional turning operation.
FIG. 11B is a schematic representation of the cutting element shown in FIG. 1B during a turning operation according to one example of a method of the present invention.

Turning now to FIG. 11A, a turning operation according to the prior art is shown in which an insert 10 is in contact with a workpiece 20. The workpiece 20 rotates about a central axis thereof, the center of rotation being located on line C, and the cutting edge 18 is aligned with the center of rotation. In this position, the rotation of the workpiece 20 applies a force G to the cutting edge 18, and consequently presses the entire insert 10 in a downward direction. Since the cutting edge 18 is aligned with the center-point of rotation, and since the relief surface 16 is angled, the insert 10 has essentially no support against the force G applied thereto.

Turning to FIG. 11B, the insert 10' according to the present invention is shown which is essentially similar to the insert disclosed with respect to FIG. 1B. However, in contrast to the turning operation shown in FIG. 11A, the insert 10' in the present figure is shown positioned such that the cutting edge 18' thereof is offset upwards from the center of rotation. In this position, the same force G is applied to the insert 10', however, due to the offset, the force G is countered by providing a support for the protrusions 30 penetrating into the workpiece 20. Thus, the load applied to the insert 10' is essentially lower than that applied to the insert 10 according to the prior art. Reducing the load may allow working at higher rotation speed and feed.

Figure 12A:
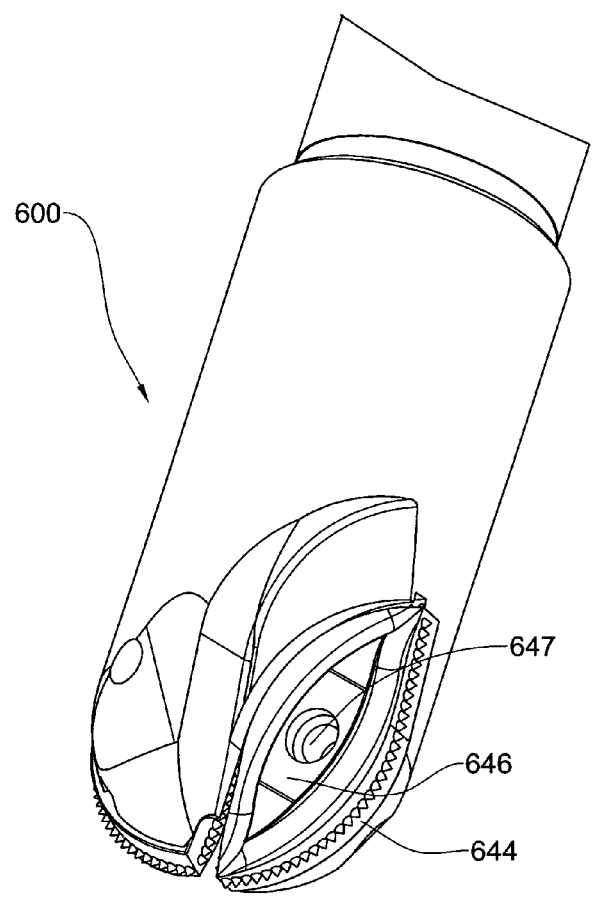
FIG. 12A is a rounding tool employing a rounded cutting insert according to still another embodiment of the present invention.
Figures 12B, 12C:
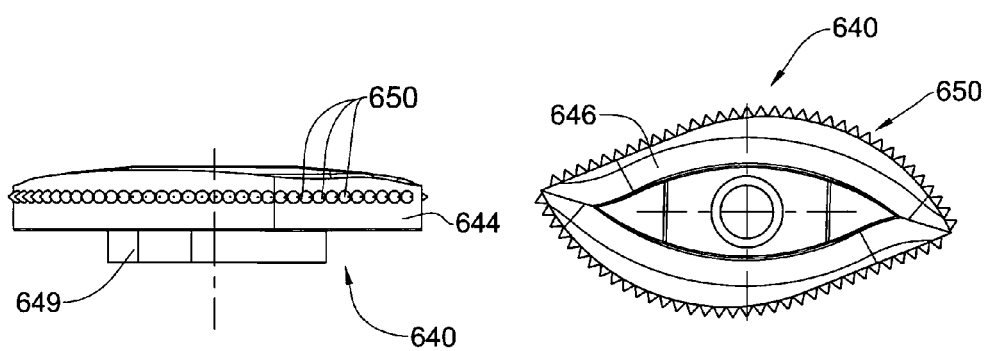
FIGS. 12B and 12C are top and front views of the rounded cutting insert of FIG. 12A.

Attention is now drawn to FIGS. 12A to 12C, disclosing a cutting insert 640 for rounding operation adapted to be mounted on a rounding tool 600. The cutting insert 640 is formed with a circumferential relief surface 644 and a rake surface 646. The relief surface 644 is formed with a row of conical protrusions 650 similar to those described with respect to FIGS. 7A to 8E.

The cutting insert 640 is mounted onto the rounding tool 600 via a seat portion 649 formed with a through going bore 647 adapted for receiving therein a fixation bolt not shown).

In general, the cutting insert 640 operates in a similar manner to previously described cutting inserts.

Figure 13A:
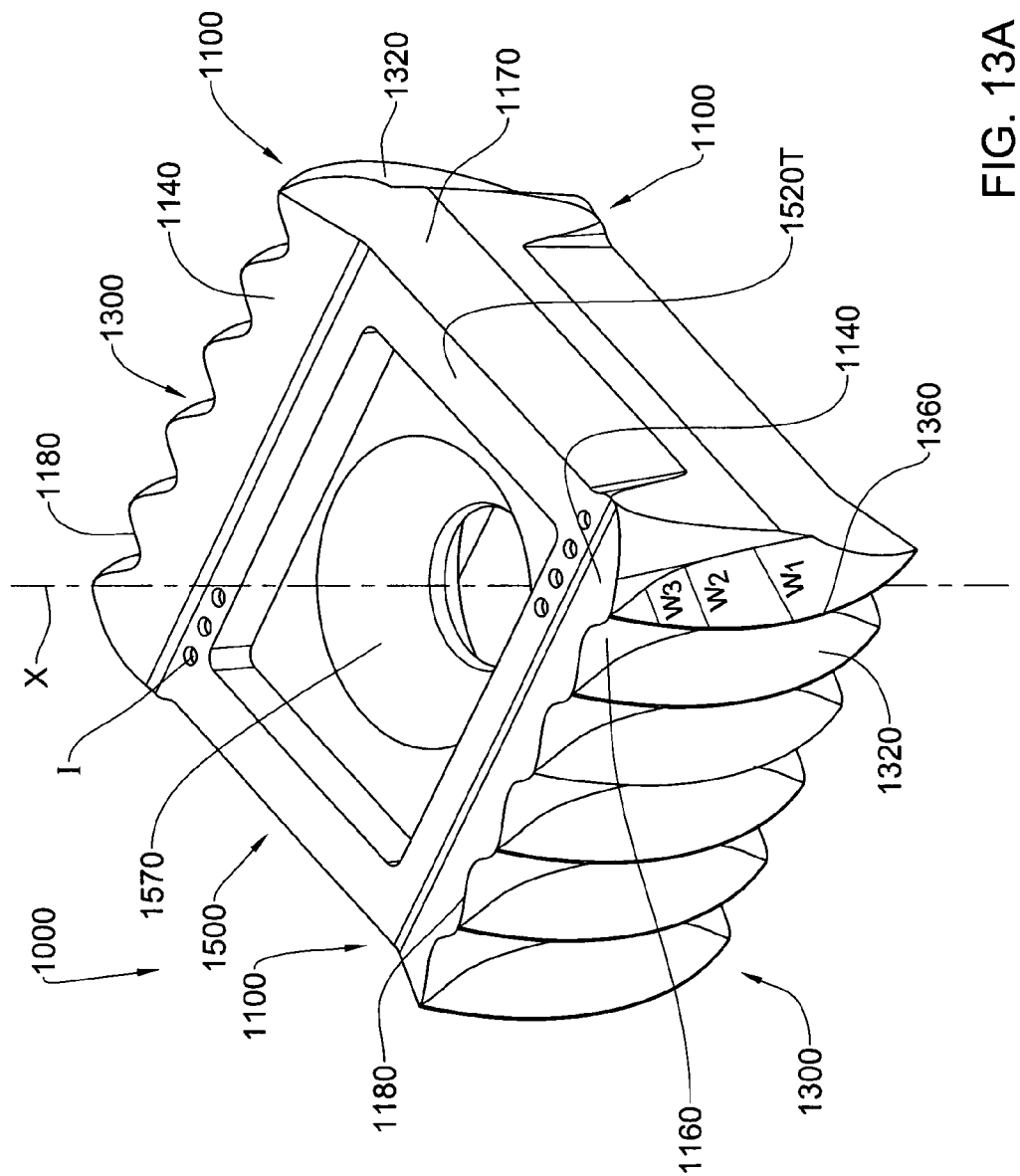
FIGS. 13A to 13E are respective isometric, top, tilted top, front and side views of a cutting insert according to still another embodiment of the present invention.
Figure 13B:
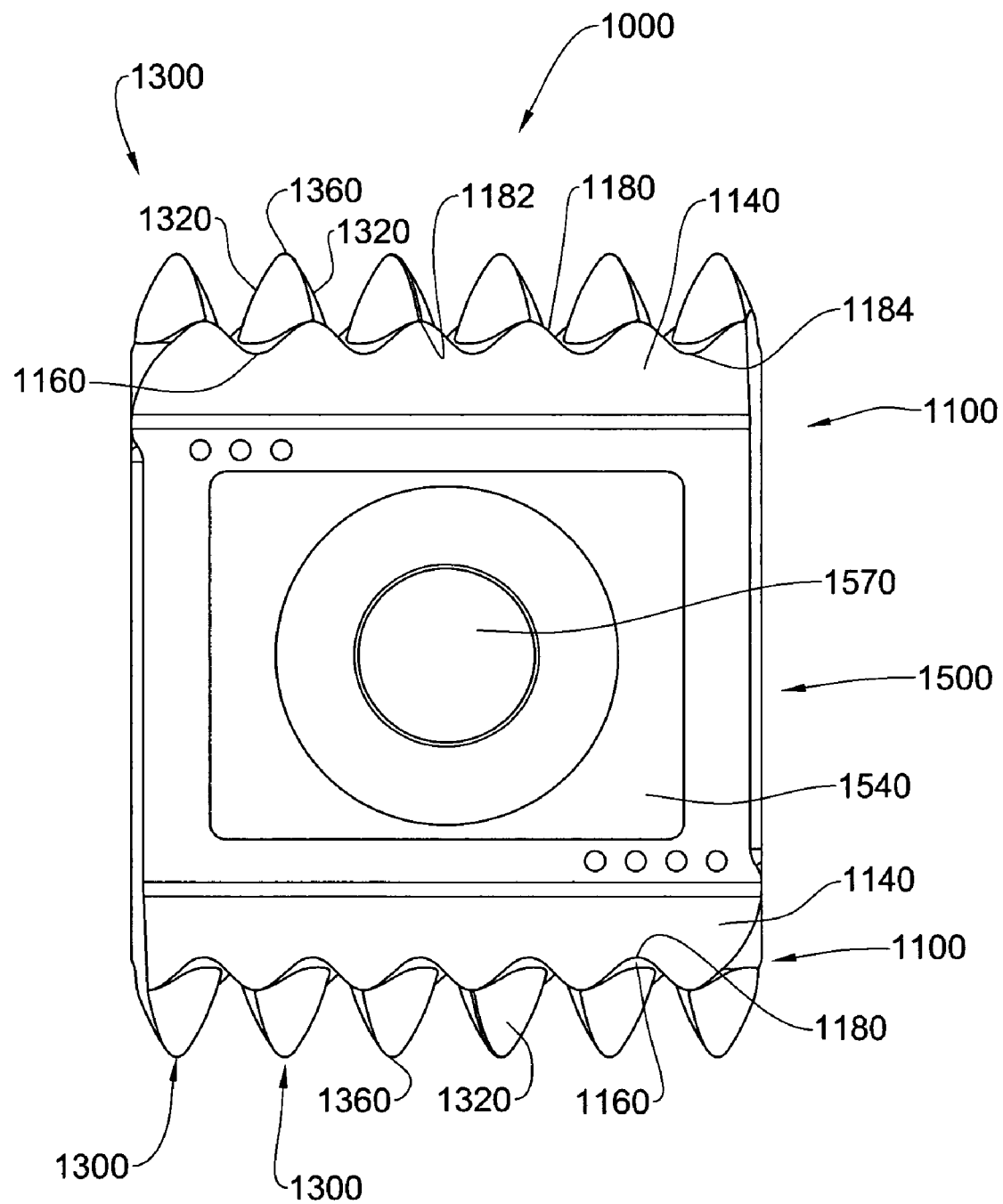

Turning now to FIG. 13A, an embodiment of a cutting insert generally designated 1000, is shown having an essentially rectangular form, defined by top and bottom surfaces 1520T and 1520B, first side surfaces 1160 and second side surfaces 1170. The insert has four peripheral cutting portions 1100 and a central mounting portion 1500 with a mounting bore 1570. With reference to FIG. 13E, the cutting insert 1000 has a double symmetry, with respect to its central axis X passing through the center of the mounting bore perpendicularly to the top and bottom surfaces of the insert and central axis A which is generally parallel to the top and bottom surfaces, passing through the middle of the insert's thickness between these surfaces and crossing the axis X. Thus, the cutting insert 1000 is indexible with four cutting edges 1180, two top ones 1180T, and two bottom ones 1180B.

Each cutting edge 1180 has a rake surface 1140, constituted by an adjacent portion of the top surface 1520T or a bottom surface 1520B, and a relief surface 1160 constituted by an adjacent portion of the first side surface 1160. Each cutting edge 1180 has an undulated, e.g. sinusoidal shape with peaks 1182 and valleys 1184.

As best seen in FIG. 13E, the rake surface 1140 associated with each cutting edge is inclined at an acute angle λ with respect the central axis A of the cutting insert.

The first side surface 1160 is formed with a set of deforming protrusions 1130 extending between a top cutting edge 1180T and a bottom cutting edge 1180B of the cutting insert 1000. Each protrusion 1300 has two side walls 1320 defining therebetween a ridge 1360, which is curved in its cross-section taken perpendicular to the top and bottom surfaces of the insert. The curvature of the ridge 1360 is such that its width in the direction perpendicular to its length L between the top and bottom cutting edges 1180T and 1180B, has a maximal value $W_1$ at a location in the middle of the length, the width decreasing towards the cutting edges 1180T and 1180B, i.e. $W_3 < W_2 < W_1$ as shown in FIG. 13A.

Figure 13C:
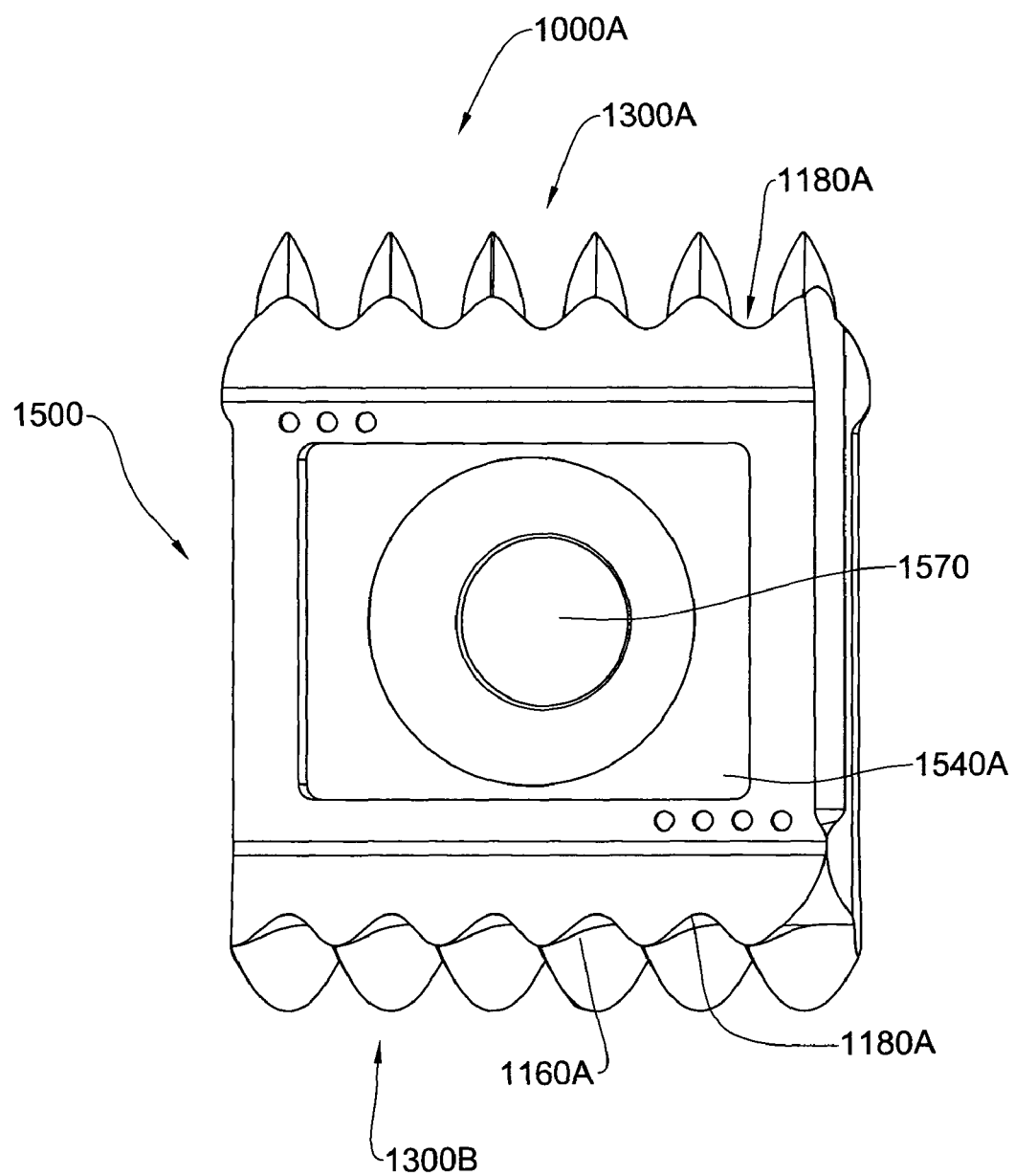

It is observed from FIG. 13C, that the protrusions 1300 are arranged so as to correspond to the peaks 1182 of the sinusoidal cutting edge 1180. It is also noted that the protrusions 1300 are arranged at an angle with respect to the top and bottom surfaces 1520T, 1520B respectively. However, it should be understood that the cutting edge 1180 on the top face 1520T of the cutting insert 1000, and the cutting edge 1180 on the bottom face 1520B of the cutting insert 1000 are not aligned, whereby the 'valleys' formed between the crests of the cutting edges are also angled to the top and bottom surfaces 1520T, 1520B respectively. It thus follows, as will be explained in detail with respect to FIGS. 14A to 14C, that during operation of the cutting insert 1000, the entire cutting insert 1000 is tilted in order for the ridge 1360 of the protrusions 1300 to be aligned with the direction of cutting.

Figure 13D:
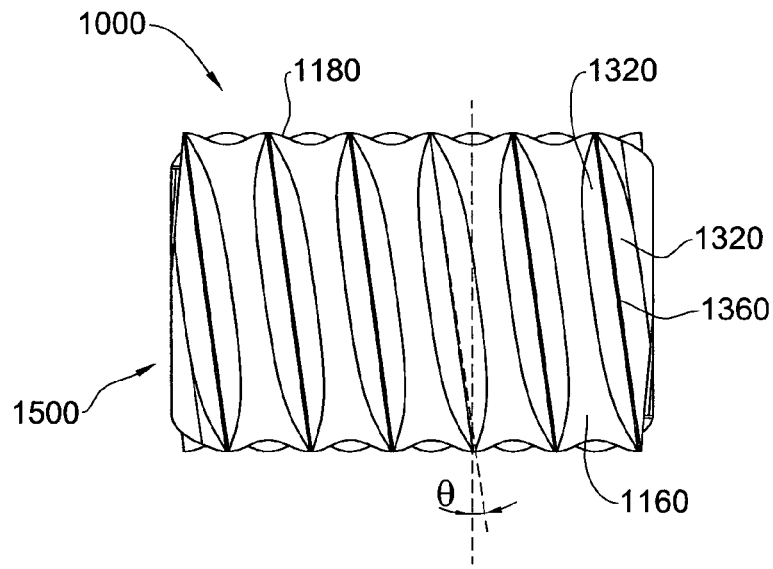
Figure 13E:
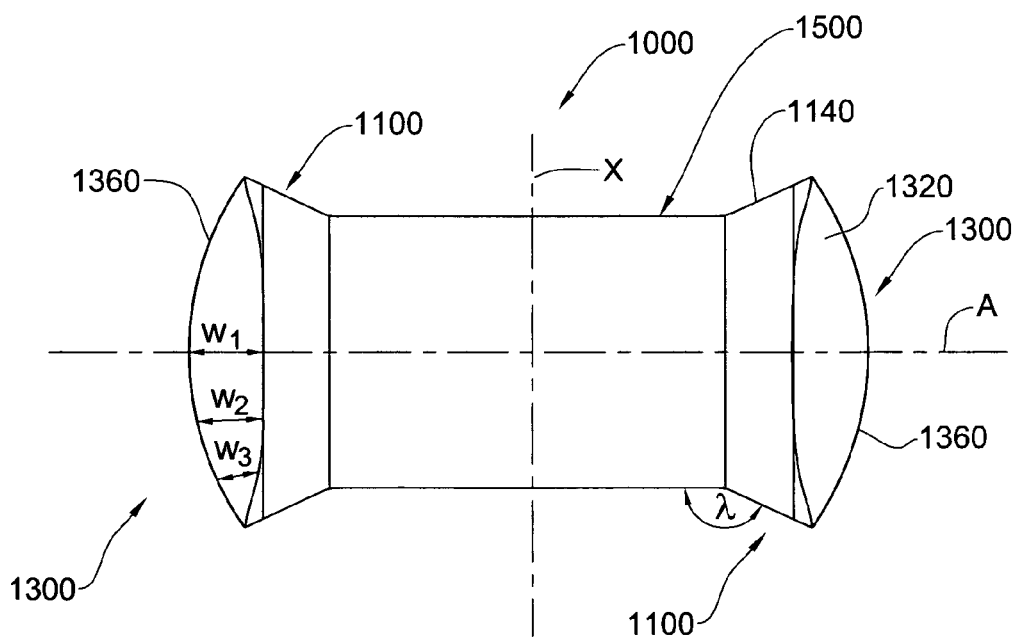

With particular reference to FIGS. 13B to 13E, and particularly to FIG. 13D, the deforming protrusions 1300 on each first side surface 1160 of the cutting insert 1000 are formed so that each of their ridge 1360 lies in an imaginary plane which forms an angle θ with respect to a plane perpendicular to both first side surfaces 1160 of the cutting insert 1000. Such an arrangement, as previously mentioned, requires positioning the entire cutting insert 1000 at an angle, thereby allowing the sides surface 1160 to serve as a relief surface, while maintaining symmetry between the top an bottom surfaces 1520T, 1520B respectively, allowing the cutting insert 1000 to employ all four cutting edges 1180 thereof.

Figure 14A:
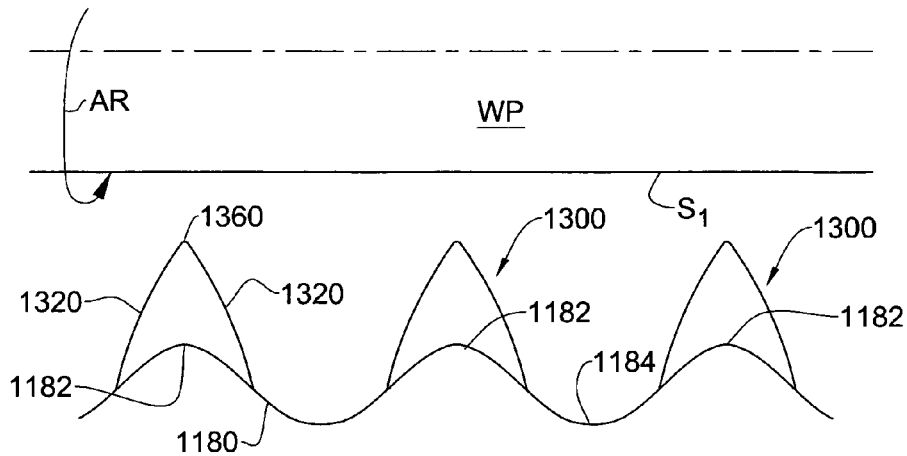
FIGS. 14A to 14C are schematic cross-sectional views showing the stages of the cutting operation using the cutting insert shown in FIGS. 13A to 13E.
Figure 14B:
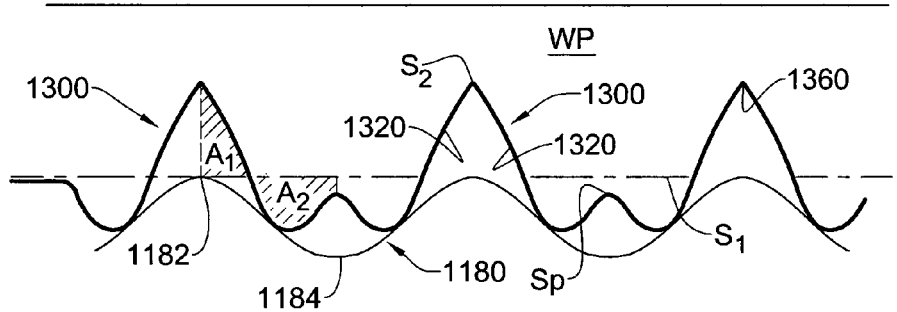
Figure 14C:
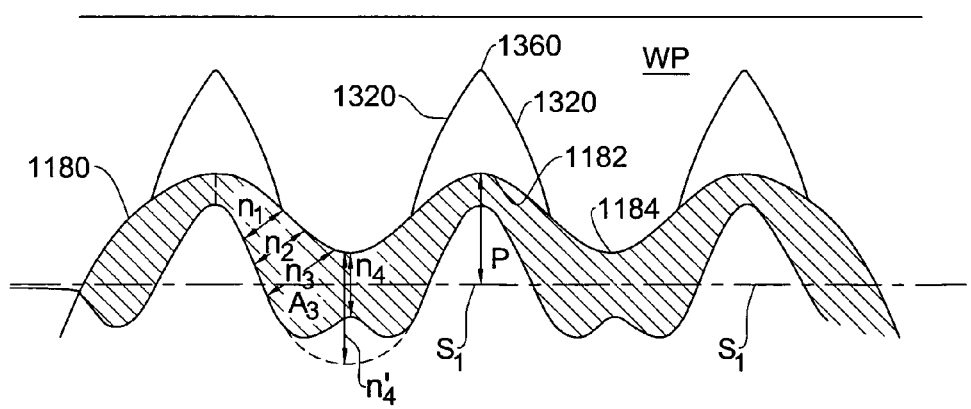

With reference to FIGS. 14A to 14C, the cutting insert 1000 is shown before and during a turning operation in a feed direction of a workpiece WP revolving in a direction AR, with the depth of cut per each revolution of the workpiece being P.

In operation, the cutting insert 1000 is brought to come in contact with outer surface S1 of the workpiece WP, wherein before the cutting edge 1180 contacts the outer surface S1 (FIG. 14B), the protrusions 1300 enter the workpiece WP, and cause deformation of the outer surface $S_1$ thereof to receive a deformed shape $S_2$ having a peak $S_p$ formed between each two protrusions 1300, due to the material of the workpiece WP being pushed towards the trough by each two adjacent protrusions. It is observed that the amount of material previously in area defined by the depth of cut $A_1$ becomes funneled to area $A_2$.

In the operation stage show in FIG. 14C, the cutting edge 1180 penetrates the workpiece WP, and the undulating cutting edge 1180 removes material from the workpiece WP. It should be particularly observed that the material removed by the cutting edge 1180 is distributed such that the thickness of the material is slightly increasing towards the valley 1184 of the cutting edge, but is generally similar along the entire cutting edge 1180, i.e. $n_1 \cong n_2 \cong n_3$. It is also noted that in the valley 1184 of the cutting edge, the material to be removed does not have an expected width $n_4'$ but is rather $n_4$ due to the previously discussed surface peak $S_p$, thus neatly avoiding the need to remove a great amount of material at once.

It should be noted that, in general, the peaks of the cutting edge 1180 are subjected to more wear than the valleys thereof. It is observed that under the present sinusoidal design of the cutting edge 1180, more material of the workpiece WP is removed by the valleys 1184 than by the peaks 1184, thereby prolonging the lifetime of the cutting tool.

Figure 15A:
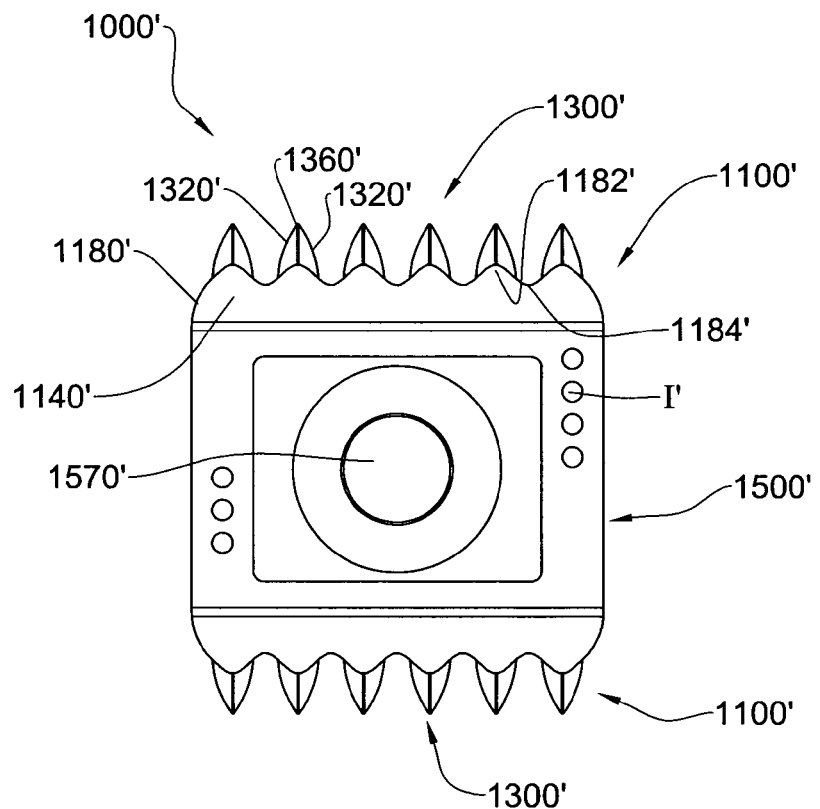
FIGS. 15A and 15B are respective top and front views of a cutting insert which is a design variation on the cutting insert shown in FIGS. 13A to 13E.
Figure 15B:
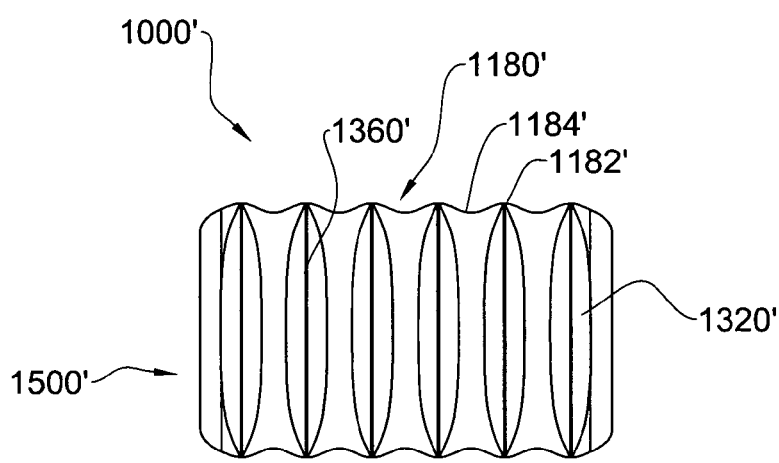

Turning now to FIGS. 15A and 15B, an embodiment of the cutting insert 1000 is shown, generally designated 1000' being generally similar to the cutting insert 1000 with the difference being that the protrusions formed at its first side surfaces are not angled.

Figure 16A:
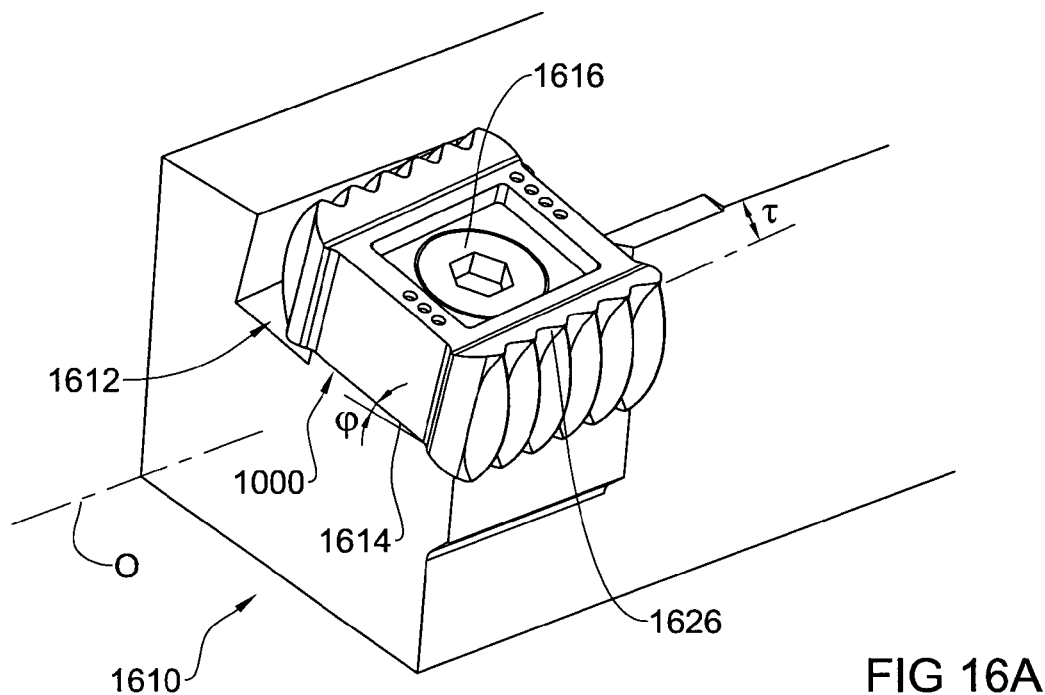
FIGS. 16A and 16B are schematic isometric views of side and front turning tools employing the cutting insert shown in FIGS. 13A to 13E.
Figure 16B:
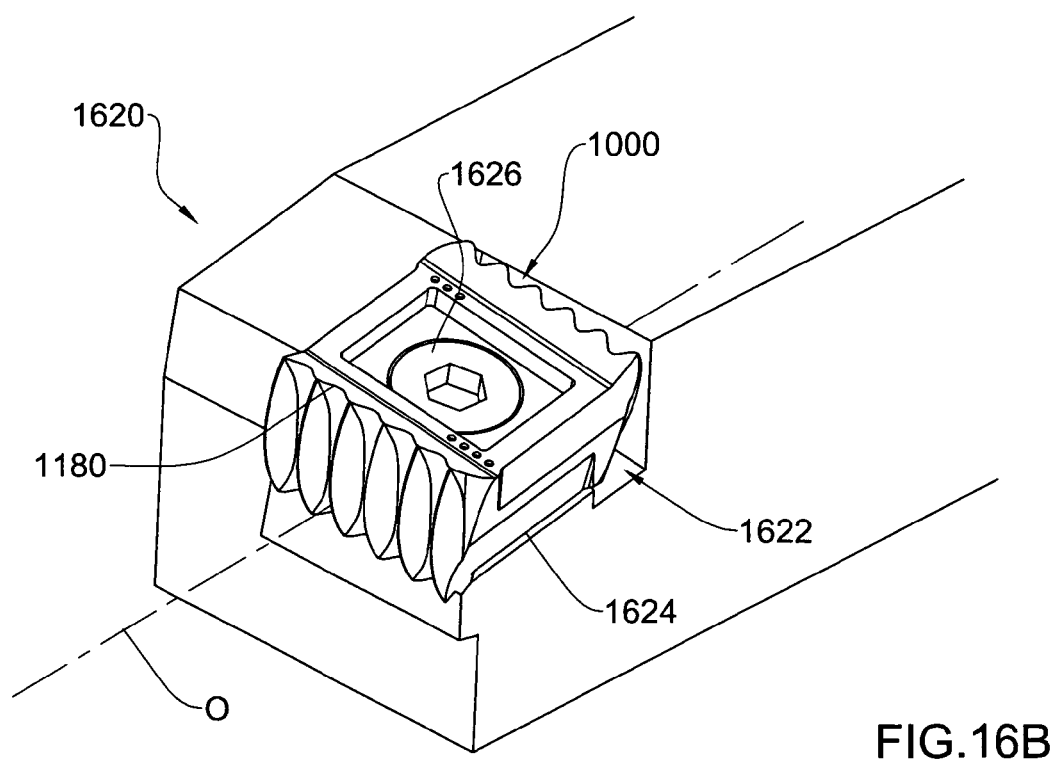

Attention is now drawn to FIGS. 16A and 16B, in which a side turning tool generally designated 1610, and a front turning tool generally designated 1620 are shown, having mounted therein the cutting insert 1000 shown in FIGS. 15A and 15B. The tools each have a central axis O and a seat 1614, 1624, which is angled at φ to a plane comprising the axis O in a cross-section of the tool taken through the seat perpendicular to the axis O. This ensures that the cutting edge 1180 comes in contact with the workpiece WP (not shown) such that the rake surface 1140 is perpendicular to the surface of the workpiece WP. The seat is further angled at τ to a plane comprising the axis O in a cross-section of the tool taken through the seat parallel to the axis O such that the deforming protrusions 1300 are perpendicularly oriented with respect to the workpiece WP. In other words, the cutting insert 1000 when mounted in the tool, is tilted in two directions during operation of the cutting tool.

In operation, the side turning tool 1610 is oriented such with respect to the WP (not shown) that the central axis O thereof is parallel to that of the axis of rotation of the WP. The front turning tool 1620 is oriented such with respect to the WP (not shown) that the central axis O thereof is perpendicular to that of the axis of rotation of the WP.

Figure 16C:
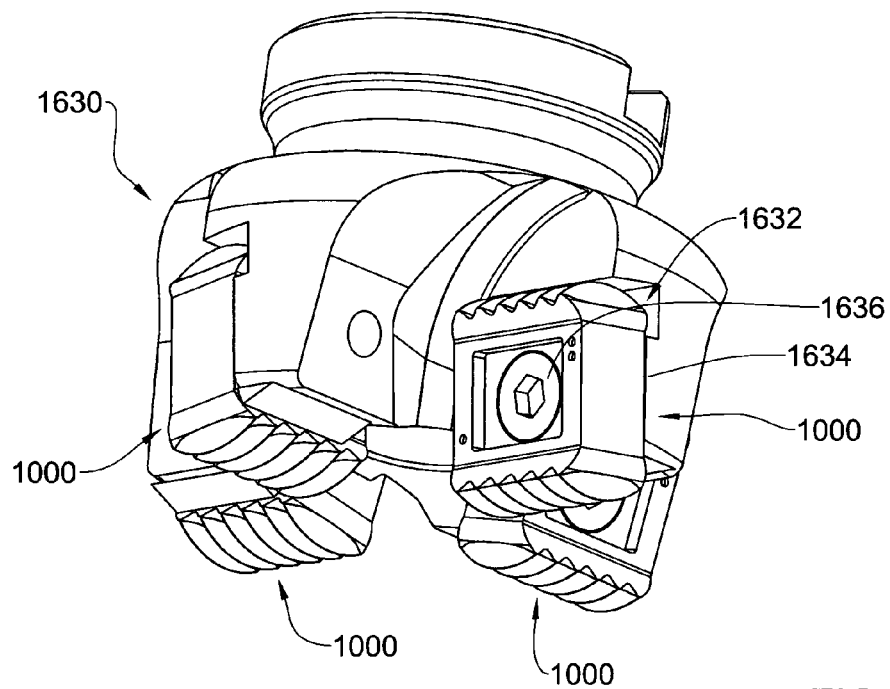
FIGS. 16C and 16D are schematic isometric views of axial milling tools employing the cutting insert shown in FIGS. 13A to 13E.
Figure 16D:
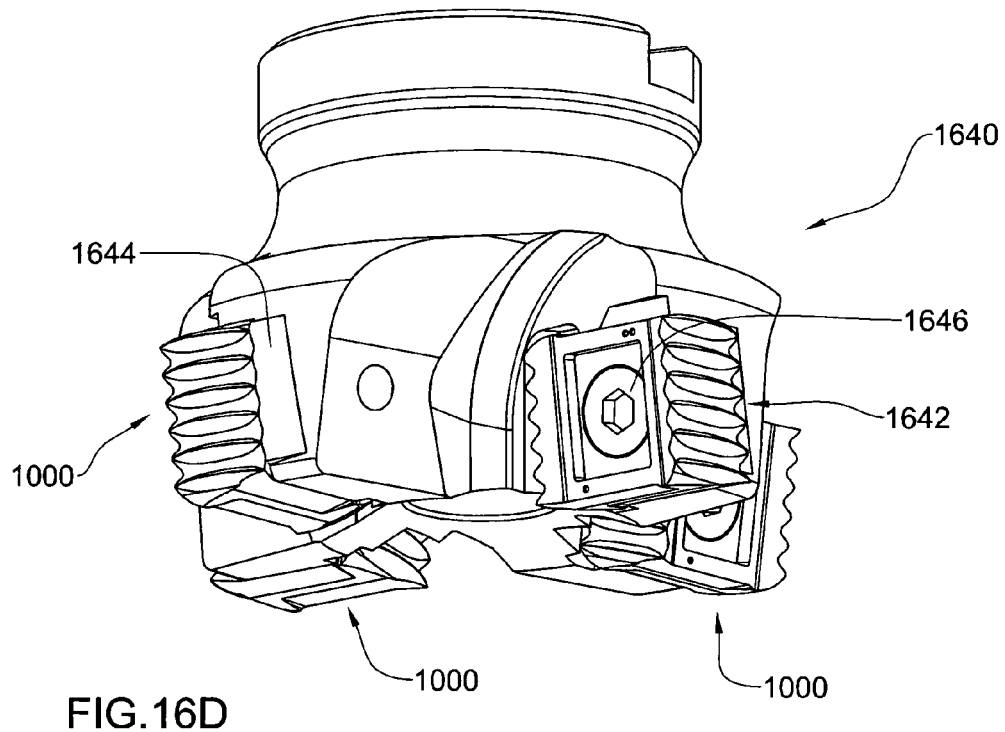

Turning now to FIGS. 16C and 16D, two additional axial milling tools are shown—a front milling head 1630, and a side milling head 1640, each comprising four cutting inserts 1000. The front milling head 1630 is adapted to progress within the workpiece (not shown) in a feed direction essentially parallel to the central axis Z thereof, and the front milling head 1640 is adapted to progress within the workpiece (not shown) in a feed direction essentially perpendicular to the central axis Z thereof. The cutting inserts 1000 are mounted onto the milling heads 1630, 1640 in a manner similar to that described with respect to FIGS. 16A and 16B.

Figure 17A:
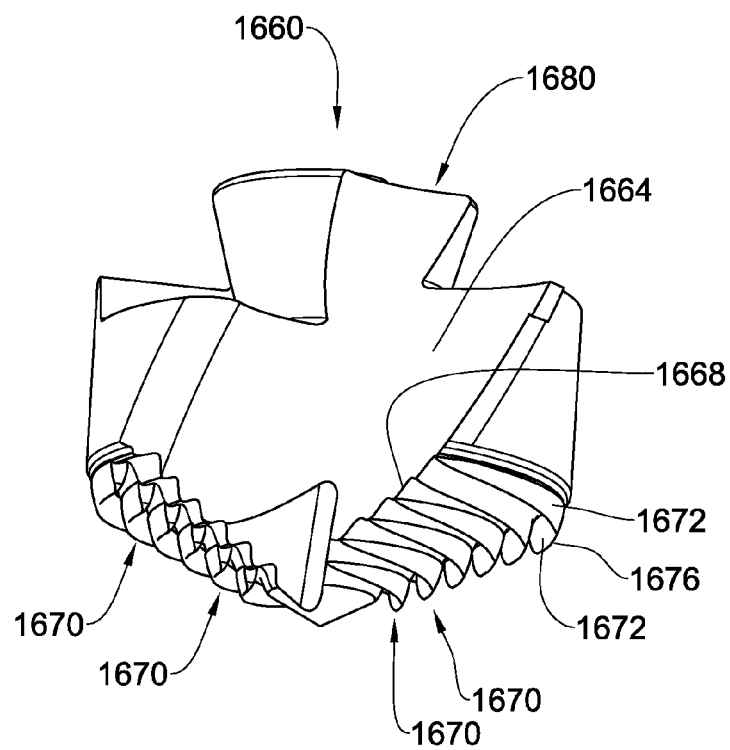
FIG. 17A is a schematic isometric view of a drilling tool comprising a drilling head according to another embodiment of the present invention.
Figure 17B:
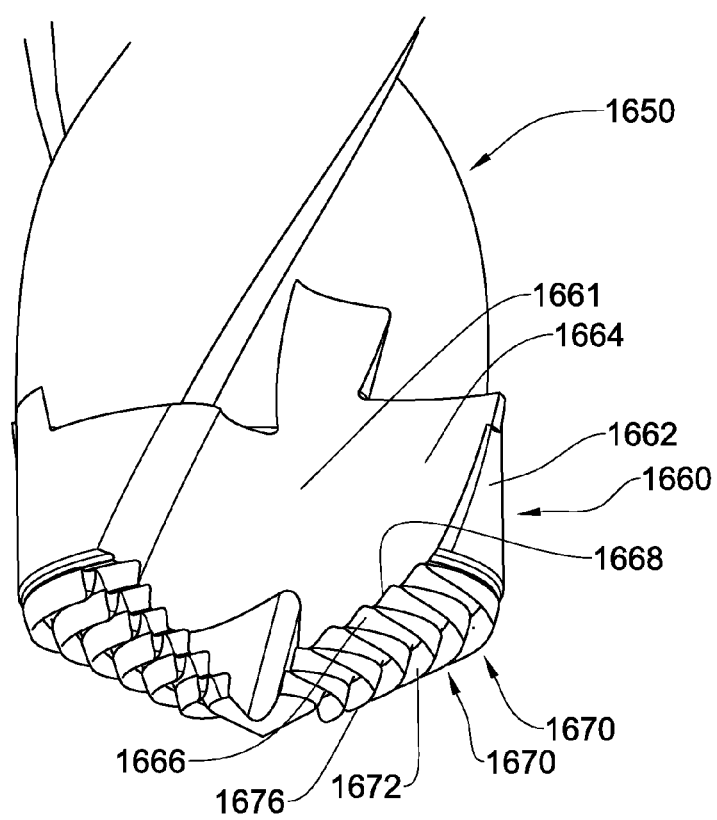
FIG. 17B is a schematic isometric view of the drilling head shown in FIG. 17A.

Attention is now drawn to FIGS. 17A and 17B, in which a drilling tool generally designated 1650 is shown comprising a drilling head 1660 having two cutting portions, each being formed with a plurality of circumferentially extending deforming protrusions 1670.

It is noted that the drilling head 1660 has a cutting edge 1668 with a similar sinusoidal undulation as that shown with respect to the cutting inserts 1000. However, as previously mentioned, in the present case the deforming protrusions extend circumferentially on the relief surface 1666 of the drilling head. In addition, the extent to which the deforming protrusions 1660 protrude from the relief surface 1666 gradually increases having a minimal value at an end adjacent the cutting edge 1668, and a maximal value at an end remote from the cutting edge 1668.

The drilling tool 1650 operates in a manner similar to that disclosed with respect to FIGS. 14A to 14C. In other words, the workpiece WP (not shown) coming in contact with the cutting edge 1668 of the drill head 1660 experiences the same effect as that disclosed with respect to FIGS. 14A to 14C.

Attention is now drawn to FIGS. 18A to 18C, in which a parting tool generally designated 1760, straight saw generally designated 1770 and a circular saw generally designated 1780 are shown, all comprising a cutting insert generally designated 1700.

The cutting insert 1700 has a mounting portion 1702 and a cutting portion 1710. The cutting portion 1710 is formed with a round cutting edge 1718 defined between a rake surface 1714 and a relief surface 1716, and is further formed with a single deforming protrusion 1730.

The deforming protrusion 1730 is similar in construction to the deforming protrusion 1300 in FIGS. 13C to 13D. However, in the present example, the cutting insert 1700 is not designed to be reversible, and therefore the deforming protrusion 1730 is in fact in the shape of half a protrusion 1300.

In operation, in all three tools, i.e. the deforming protrusions of the parting tool 1760, the straight saw 1770 and the circular saw 1780, operate in the same manner as originally disclosed with respect to FIG. 1B.

One advantage of the above design, specifically important for parting tools, is prevention of 'traveling' of the cutting edge 1718, i.e. lateral movement thereof with respect to the workpiece WP, and consequently an increase in accuracy. This is due to the deforming protrusion 1730 penetrating the workpiece WP before the cutting edge 1718, thereby preventing the cutting insert 1700, and consequently the cutting edge 1718 from lateral displacement.

Figure 19A:
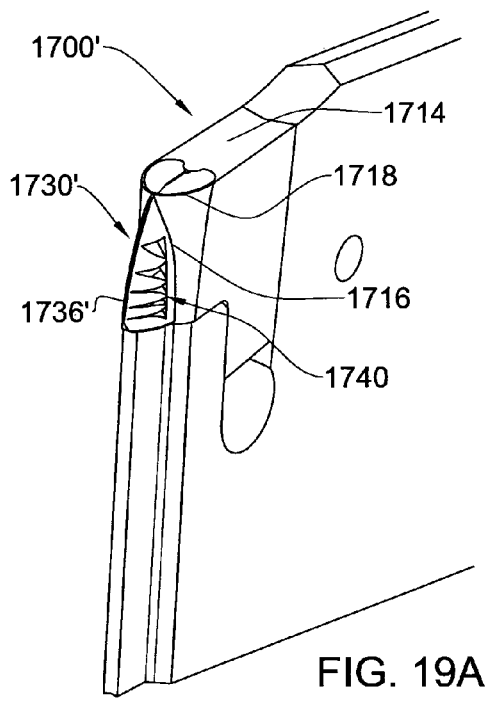
FIG. 19A is a schematic isometric view of a parting tool comprising a parting head which is a design variation on the parting head shown in FIGS. 18A to 18C.
Figure 19B:
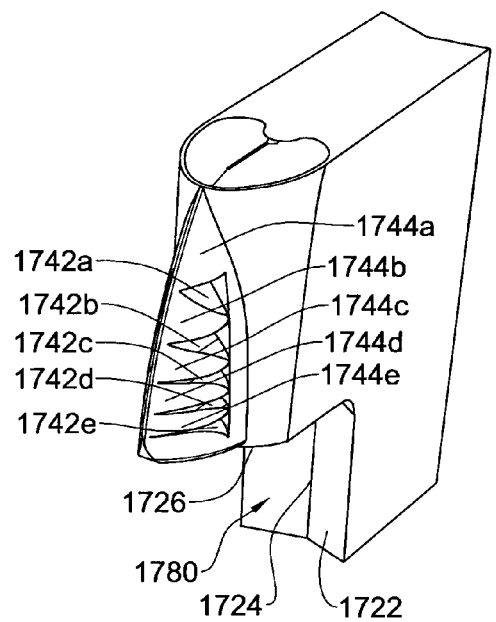
FIG. 19B is a schematic isometric view of the parting head shown in FIG. 19A.
Figure 19C:
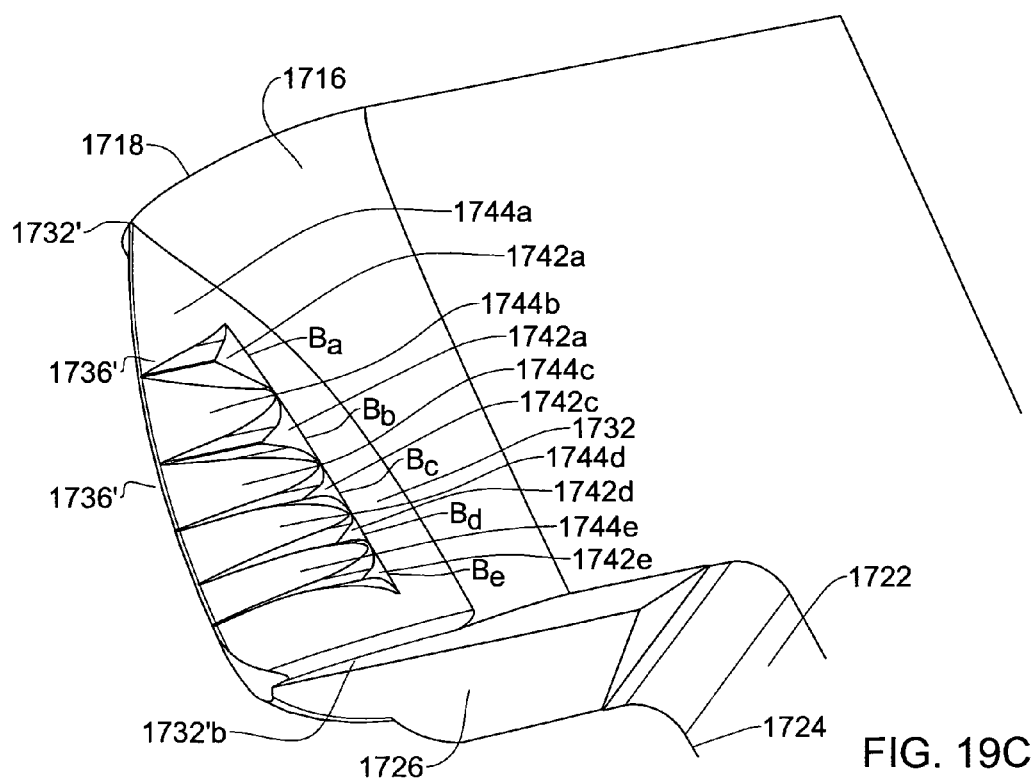
FIG. 19C is an enlarged view of a portion of the parting head shown in FIG. 19B.

Attention is now drawn to FIGS. 19A to 19C, in which the cutting insert 1700 is shown having a deforming protrusion designed according to a different embodiment, generally designated 1730'.

The deforming protrusion 1730' is formed with a pressure relieving arrangement 1740, in the form of a set of indentations 1742 in side walls 1732' of the deforming protrusion 1730'. The set of the indentations 1742a to 1742e is disposed along each of the side walls 1732' spanning between a first end 1732'a of the side wall adjacent the cutting edge 1718, and a second end 1732'a of the side wall 1732' remote from the cutting edge 1718.

Each indentation 1742a to 1742e has a generally triangular shape, the vertex V of which is adjacent the ridge 1736' and the base B of which is remote from the ridge 1736'. The length of the base B of each of the indentation 1742a to 1742e decreases in direct proportion to its distance from the cutting edge 1718, i.e. the farther the indentation from the cutting edge 1718, the shorter the base B thereof. For example, it may be observed that the length of the base $B_a$ is greater than the length of the base $B_e$.

In operation, when the deforming protrusion 1730' penetrates the workpiece WP, the material of the workpiece WP is urged to deform and 'flow' along the sidewalls 1732' of the deforming protrusion 1730'. When the material 'flow' reaches one of the indentations 1742a to 1742e, it penetrates therein, thereby having more room to deform, whereby the pressure on the deforming protrusion is somewhat relieved. This relief may provide for a longer lifetime of the cutting tool using such an insert 1730', greater progress into the workpiece WP and other advantages previously discussed.

It should be noted that the pressure relieving arrangement may be applied to the majority of cutting tools and deforming protrusions previously described.

Figure 20:
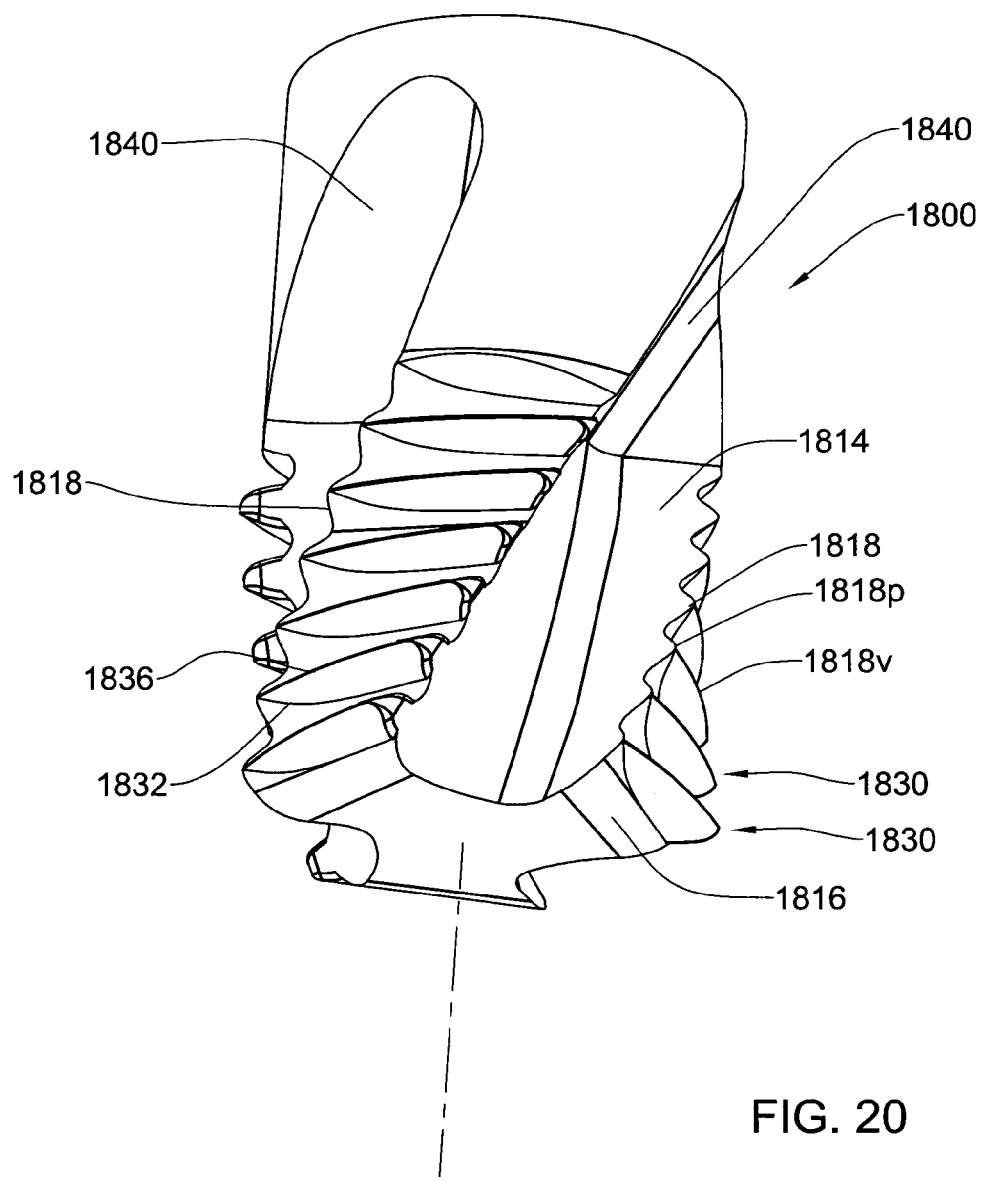
FIG. 20 is a schematic isometric view of a rough milling head according to another embodiment of the present invention.

Turning now to FIG. 20, a rough milling tool generally designated 1840 is shown formed with an undulating cutting edge 1818 similar to the cutting edges 1180, 1718 etc. previously described, and with deforming protrusions 1830 having a design similar to the deforming protrusion 1730 of the parting tool shown in FIG. 18A. The milling head operates much the same way as previously described with respect to FIGS. 5A to 5G.

Turning now to FIGS. 21A to 21D, another embodiment of a cutting insert generally designated 2000 is shown, comprising four cutting portions 2192, and four deforming portions 2194. Each cutting portion comprises a cutting corner 2180 defined between a rake surface 2140 and a relief surface 2160. Each deforming portion is formed with a deforming protrusion 2320, having a similar shape to the deforming protrusion shown in FIG. 1B, though it is not formed directly on the relief surface 2160, but rather on a portion of the cutting insert adjacent the cutting edge and formed so as to be able to deform a workpiece during a pre-cutting, deforming operation.

Figure 21A:
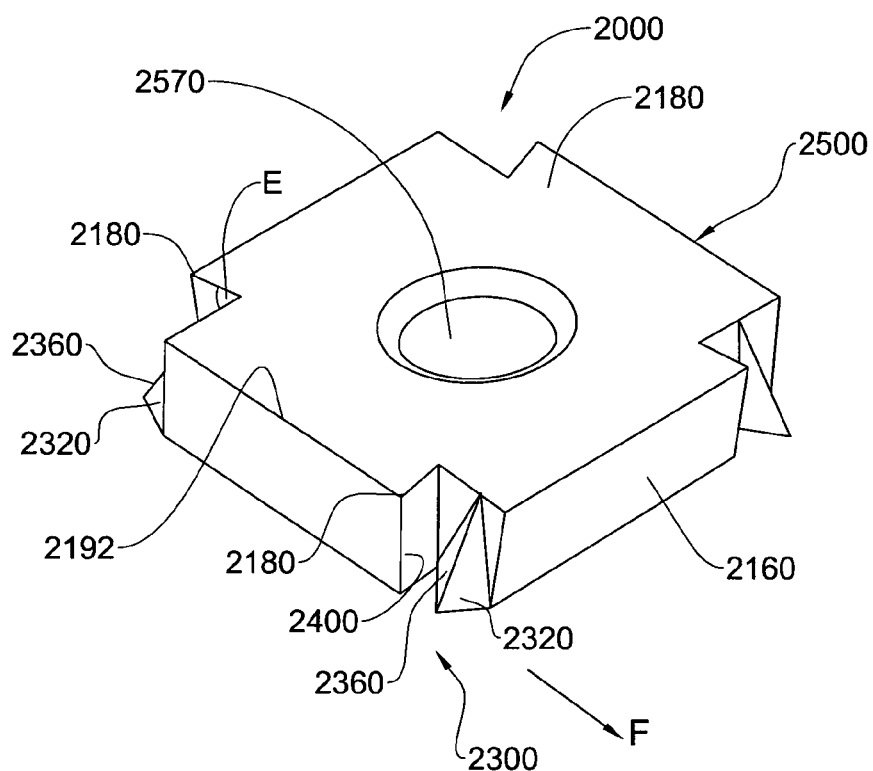
FIG. 21A is a schematic isometric view of a cutting insert according to still a further embodiment of the present invention.
Figure 21B:
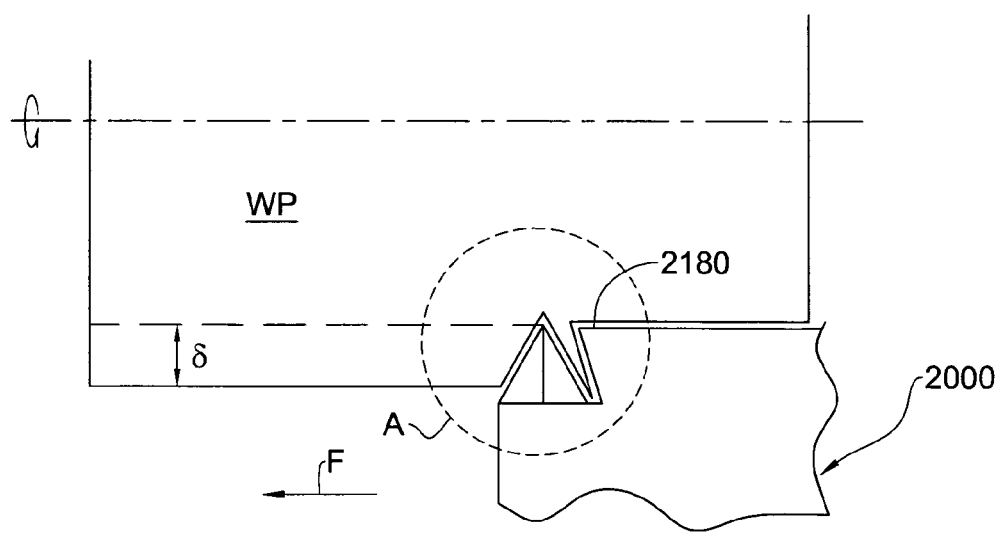
FIG. 21B is a schematic side view demonstrating a turning operation using the cutting insert shown in FIG. 21A.
Figure 21C:
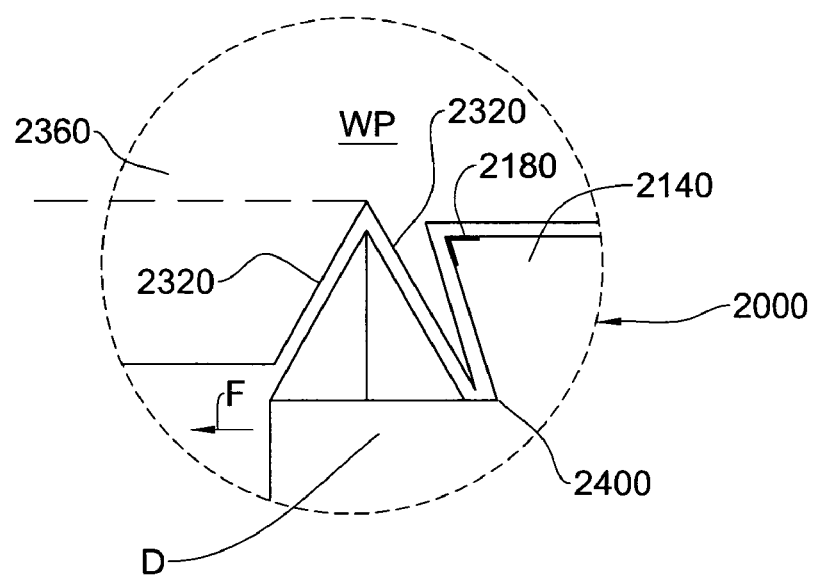
FIG. 21C is an enlarged view of a detail A shown in FIG. 21B.
Figure 21D:
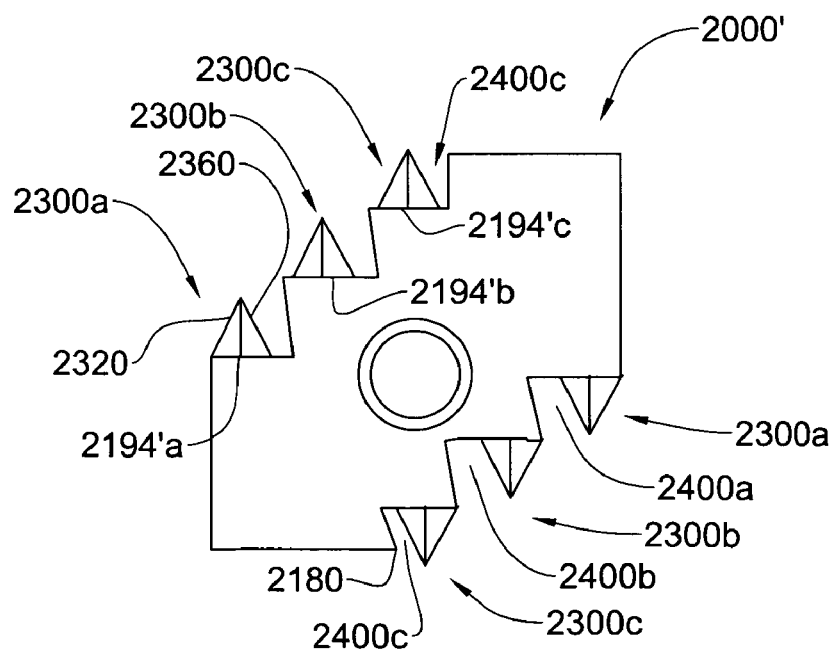
FIG. 21D is a schematic top view of a cutting insert which is a design variation on the cutting insert shown in FIGS. 21A to 21C.

With particular reference to FIGS. 21B and 21C, before a cutting operation having a feed direction F, the cutting insert 2000 is fed towards the workpiece WP in a direction perpendicular to the feed direction F such that only the deforming protrusion 2300 penetrates into the workpiece WP while the cutting edge 2180 is out of contact with the workpiece WP. Thereafter, the cutting insert 2000 is fed in the feed direction F until the cutting edge 2180 engages the workpiece 2000.

Figure 22:
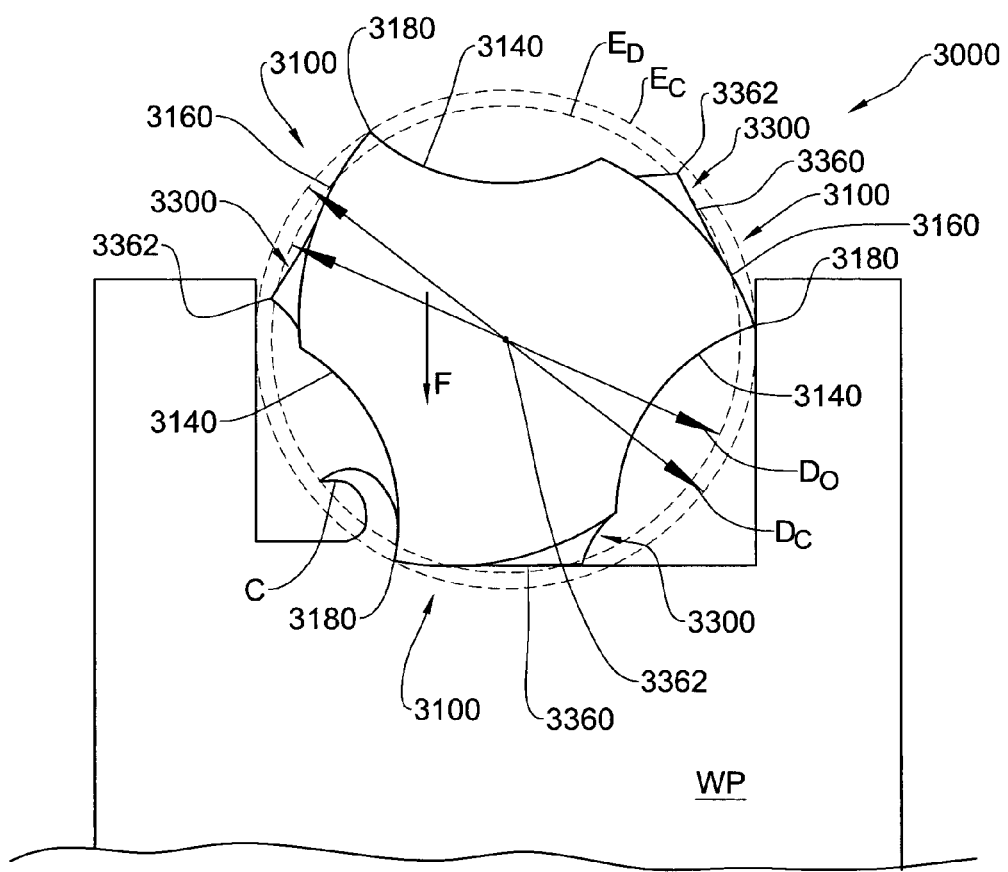
FIG. 22 is a schematic top view of a milling tool according to still a further aspect of the present invention, when performing a cutting operation on a workpiece.

Turning now to FIG. 22, a milling tool generally designated 3000 is shown having three cutting portions 3100, each having a rake surface 3140 and a relief surface 3160 defining at an intersection thereof a cutting edge 3180.

Each relief surface 3160 is also formed with a deforming protrusion 3300 extending transverse thereto and having a deforming ridge 3360 with a peak 3362. The diameter $D_D$ of circumferential envelope $E_D$ defined by the peeks 3362 of the deforming protrusions 3300 does not exceed the diameter $D_C$ of the circumferential envelope $E_C$ defined by the cutting edges 3180. The milling tool 3000 is designed with an angular spans ϵ about the central axis X between the cutting edge and a peek 3362 of the deforming protrusion 3300.

The milling tool 3000 is shown at an intermediary position while performing a cutting operation on a workpiece WP, for removing a chip C therefrom. The cutting operation has two predetermined parameters which are the rotation speed $V_R$ of the milling tool about its central axis X, and a feed F which determines the lateral displacement of the entire milling tool 3000 into the material of the workpiece WP.

In particular, the milling tool 3000 is shown at a position in which the cutting edge 3180 has already penetrated into the material of the workpiece WP to remove the chip C therefrom, and has disengaged from the workpiece. However, contrary to common practice, in this particular example, the feed F is chosen to be great enough in order to allow the deforming ridge 3360 of the deforming protrusion 3300 to come in contact with the workpiece WP. When coming in contact therewith, the deforming ridge 3360 deforms the material of the workpiece WP thereby facilitating easier removal of a chip for the following cutting edge 3180 to come in contact with the workpiece WP.

For example, if the rotation speed $V_R$ is 750 rpm, it would yield that the milling tool 3000 completes a single turn within 0.08 sec. Since, in the present example the milling tool 3000 has three cutting portions 3100, and ϵ is about 60° (sixth of a full circle) about the central axis X, the time it takes for a peek 3362 to reach the same location with respect to the workpiece as the cutting edge 3180 is 0.08/6=0.01333 sec. According to the present example, the feed F is chosen such that within these 0.01333 sec, the milling tool 300 progresses a distance d which is at least equal to the distance between the envelopes $D_C$ and $D_D$ $$\left(\text{i.e. } \frac{D_C - D_D}{2}\right).$$

In the present example, $D_C$ is about 20 mm, and $D_D$ is about 19.99 mm. This would yield that distance d is 0.05 mm, consequently requiring a feed F of 2.25 cm/sec.

From the above, the following general formula may be extracted:

$$F = \frac{\frac{D_C - D_D}{2}}{\frac{V_R}{\varepsilon}} = \frac{\varepsilon \cdot (D_C - D_D)}{2V_R}$$

It should be understood that such a method of operation as suggested above, may, inter alia, substantially increase the life span of the milling tool 3000.

Those skilled in the art to which this invention pertains will readily appreciate that numerous changes, variations, and modifications can be made without departing from the scope of the invention, mutatis mutandis.

The invention claimed is:

1. A cutting element configured for removing a chip from a surface of a workpiece, said cutting element comprising at least one cutting edge defined by an intersection line between a rake and a relief surface, said cutting element being formed with at least one deforming protrusion at least a portion of which is spaced from the cutting edge, such that it protrudes, along a plane perpendicular to the relief surface and passing through said cutting edge, in a direction transverse to said relief surface beyond said cutting edge, and is constructed so as to deform said workpiece before its contact with the cutting edge.

2. A cutting element according to claim 1, wherein said protrusion is formed on the relief surface.

3. A cutting element according to claim 1, wherein said protrusion is formed on an extension of the cutting element spaced from the relief surface.

4. A cutting element according to claim 1, wherein said cutting element is employed in a cutting tool configured for rotary motion for cutting a stationary workpiece, and wherein the circumferential envelope defined by points of said deforming protrusions which are outermost along said direction has a greater radius than the circumferential envelope defined by said rotating cutting edge.

5. A cutting element according to claim 1, wherein said cutting element is employed in a cutting tool adapted for cutting a rotating workpiece during displacement thereof in a feed direction, and wherein said direction corresponds to the direction of the feed of said cutting element such that when said cutting edge is in contact with said workpiece, a contact is also provided between ate least one of said deforming protrusion(s) and said workpiece.

6. A cutting element according to claim 1, wherein said cutting element is a cutting tool head formed with a plurality of cutting edges defining a corresponding plurality of rake and relief surfaces.

7. A cutting tool according to claim 1, wherein said cutting element is a cutting insert configured to constitute a part of a cutting tool.

8. A cutting element according to claim 7, wherein said insert is formed with a plurality of cutting edges defining a corresponding plurality of rake and relief surfaces.

9. A cutting element according to claim 1, wherein said at least one deforming protrusion extends along the relief surface transversely to the cutting edge along a length which essentially exceeds its extension transverse to the relief surface.

10. A cutting element according to claim 9, wherein said deforming protrusion comprises a prolonged ridge, having a first end located adjacent said cutting edge and a second end spaced from the cutting edge along the relief surface.

11. A cutting element according to claim 10, wherein said ridge has a tapering form, wherein the second end of said ridge is essentially wider along a direction parallel to the cutting edge than the first end thereof.

12. A cutting element according to claim 11, wherein said ridge is elevated, such that the second end of said ridge protrudes relative to the cutting edge in the top view of the cutting element to an extent greater than the first end thereof.

13. A cutting element according to claim 10, wherein said cutting element is formed with a undulating cutting edge having peaks and troughs, and wherein said at least one deforming protrusion is positioned such that the ridge thereof is positioned between two peaks of said undulating cutting edge.

14. A cutting element according to claim 13, wherein said undulating edge is adapted to form a peak and trough pattern on said workpiece after coming in contact therewith, and wherein said at least one deforming protrusion is configured to 'split' at least one of said peaks of the pattern so as to cause deformation of said workpiece.

15. A cutting element according to claim 1, wherein said deforming protrusion is of a conical form, wherein the base of the cone is located on said relief surface and the vertex of said cone is spaced from said relief surface.

16. A cutting element according to claim 1, wherein said relief surfaces is formed with a plurality of adjacent deforming protrusions disposed side by side along said cutting edge.

17. A cutting element according to claim 16, wherein said deforming protrusions form a crests and troughs pattern.

18. A cutting element according to claim 17, wherein the deforming protrusions on one relief surface are arranged such that the phase of the peaks thereof is shifted with respect to the phase of the peaks of the deforming protrusions on a relief surface of an adjacent cutting edge.

19. A cutting element according to claim 18, wherein the shift in said phase is determined according to the number of relief surfaces.

20. A cutting element according to claim 16, wherein said protrusions are conical and wherein the vertexes thereof are of different elevations above the relief surface.

21. A cutting element according to claim 1, wherein at least one of said protrusions is angled along a plane perpendicular to both said relief surface and said rake surface.

22. A cutting element according to claim 1, wherein said cutting element provides working conditions under which the thickness of a chip n and extent u to which said at least one deforming protrusion protrudes beyond the cutting edge in the feed direction, is interrelated such that $u \leq 1.5n$.

23. A cutting element according claim 1, wherein said protrusions protrude both in a direction normal to said relief surface and in a direction normal to the rake surface, beyond the cutting edge.

24. A cutting element according to claim 1, wherein said cutting element is formed with an undulating cutting edge in the pattern of peaks and troughs, wherein the ridge of each peak is of smaller radial extension at a portion adjacent the cutting edge than at a portion spaced therefrom, whereby said ridge is configured to constitute said protrusion.

25. A method for performing a cutting operation on a workpiece using the cutting element of claim 1, said method comprising:
   (a) deforming said workpiece so as to produce a deformed external surface; and
   (b) applying to said cutting element a feed allowing the cutting edge of said element to remove at least a portion of said deformed external surface.

26. A method according to claim 25, wherein said cutting element is a part of a cutting tool, and said method further comprises the steps of:
   c) aligning the cutting edge of said cutting element above a center of rotation of said rotating workpiece;
   d) moving said cutting element towards said workpiece so as to perform the cutting of said workpiece by said cutting edge; and
   e) deforming the workpiece under said cutting edge by said one or more deforming protrusions, thereby providing support to said cutting tool by said protrusion within the workpiece.

27. A method for performing a cutting operation on a workpiece using the cutting element of claim 1, wherein said deforming protrusion has a peek defining an envelope of diameter $D_D$, said cutting edge defines an envelope of diameter $D_C < D_D$, and wherein the cutting element has a feed F chosen such that:

$$F = \frac{\frac{D_C - D_D}{2}}{\frac{V_R}{\varepsilon}} = \frac{\varepsilon \cdot (D_C - D_D)}{2V_R}.$$

* * * * *